(12) United States Patent
Chaki et al.

(10) Patent No.: US 6,516,043 B1
(45) Date of Patent: Feb. 4, 2003

(54) FUEL ASSEMBLY AND REACTOR CORE AND FUEL SPACER AND CHANNEL BOX

(75) Inventors: Masao Chaki, Hitachi (JP); Koji Nishida, Hitachiohta (JP); Motoo Aoyama, Mito (JP); Junichi Koyama, Hitachi (JP); Katsumasa Haikawa, Jyuou-machi (JP); Yasuhiro Aizawa, Hitachi (JP)

(73) Assignees: Hitachi, Ltd., Tokyo (JP); Hitachi Engineering Co., Ltd., Hitachi (JP)

( * ) Notice: Subject to any disclaimer, the term of this patent is extended or adjusted under 35 U.S.C. 154(b) by 0 days.

(21) Appl. No.: 09/471,606

(22) Filed: Dec. 23, 1999

(30) Foreign Application Priority Data

Dec. 24, 1998 (JP) ............................................. 10-367757

(51) Int. Cl.$^7$ .............................. G21C 3/00; G21C 3/34
(52) U.S. Cl. ....................... 376/438; 376/434; 376/439; 376/443; 376/444
(58) Field of Search ................................. 376/434, 438, 376/439, 443, 444, 462, 453

(56) References Cited

U.S. PATENT DOCUMENTS 4,767,595 A * 8/1988 Wolters, Jr. et al. ........ 376/353
5,267,291 A * 11/1993 Matzner et al. ............. 376/442
5,432,829 A * 7/1995 Aoyama et al. ............. 376/434
5,627,865 A * 5/1997 Williamson et al. ........ 376/434

FOREIGN PATENT DOCUMENTS

| JP | 2791132 |   | 6/1998 |
| JP | 2791132 | * | 8/1998 |

* cited by examiner

Primary Examiner—Michael J. Carone
Assistant Examiner—Jack Keith
(74) Attorney, Agent, or Firm—Mattingly, Stanger & Malur, P.C.

(57) ABSTRACT

A fuel assembly includes a plurality of fuel rods placed in a square lattice array of 9-rows/9-columns and at least one water rod. In this fuel assembly, the fuel rod pitch of the plurality of fuel rods is in a range of 14.15 mm to 14.65 mm, and means for offsetting and holding a fuel bundle composed of the fuel rods and the water rod is provided in such a manner that the center in a cross section of the fuel bundle is offset from the center in a cross section of the lower tie plate toward the channel fastener side. With this configuration, it is possible to provide a fuel assembly for a D-lattice core, which is capable of achieving the fuel economy comparable to that of a C-lattice core without reducing the thermal margin, and of using the existing fuel spacers.

6 Claims, 17 Drawing Sheets

FIG. 1
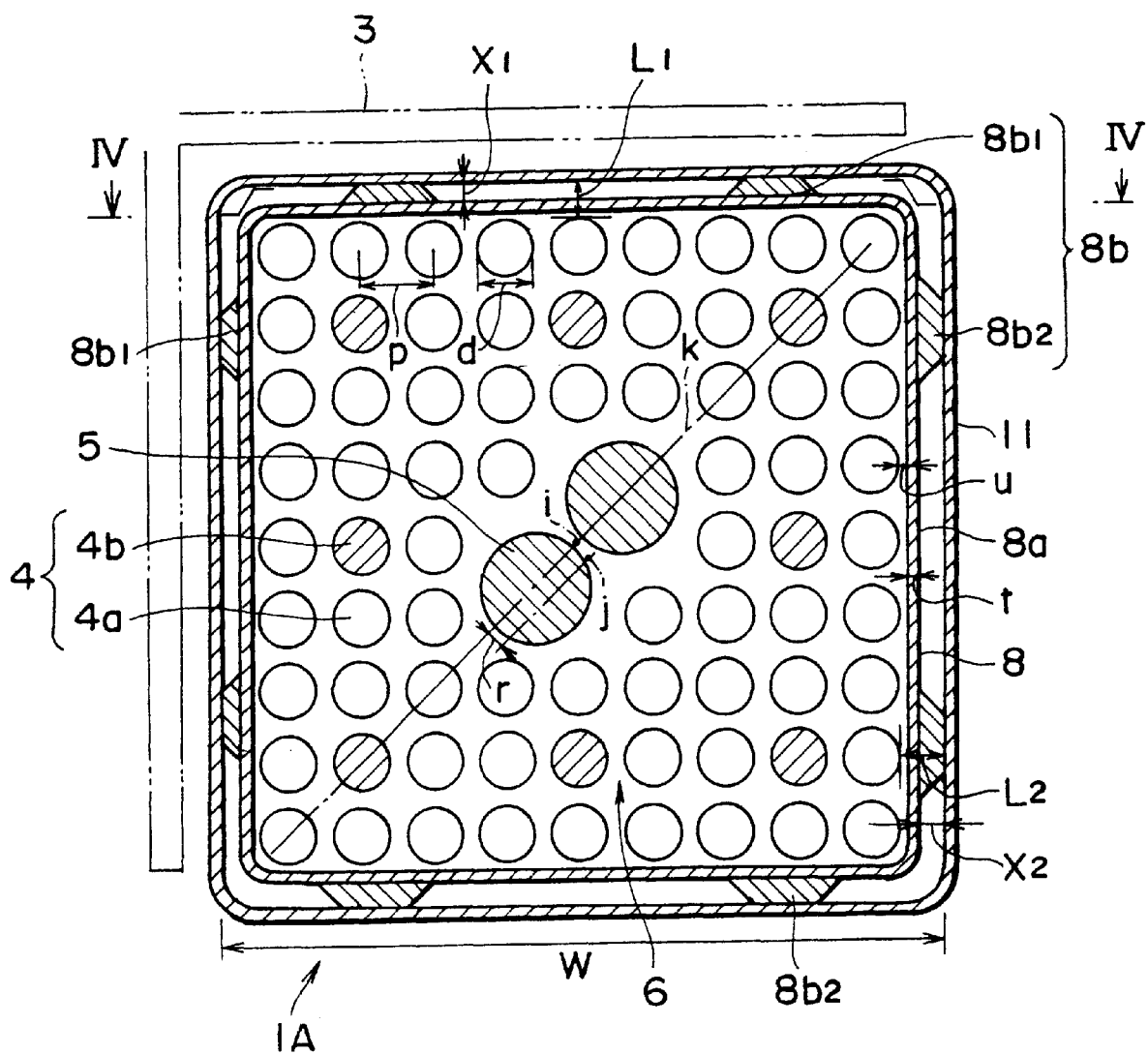
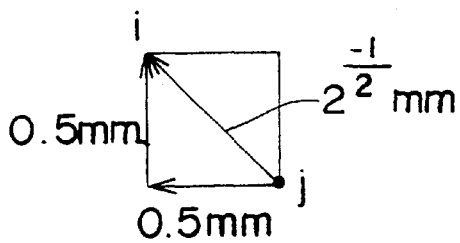

F I G. 3
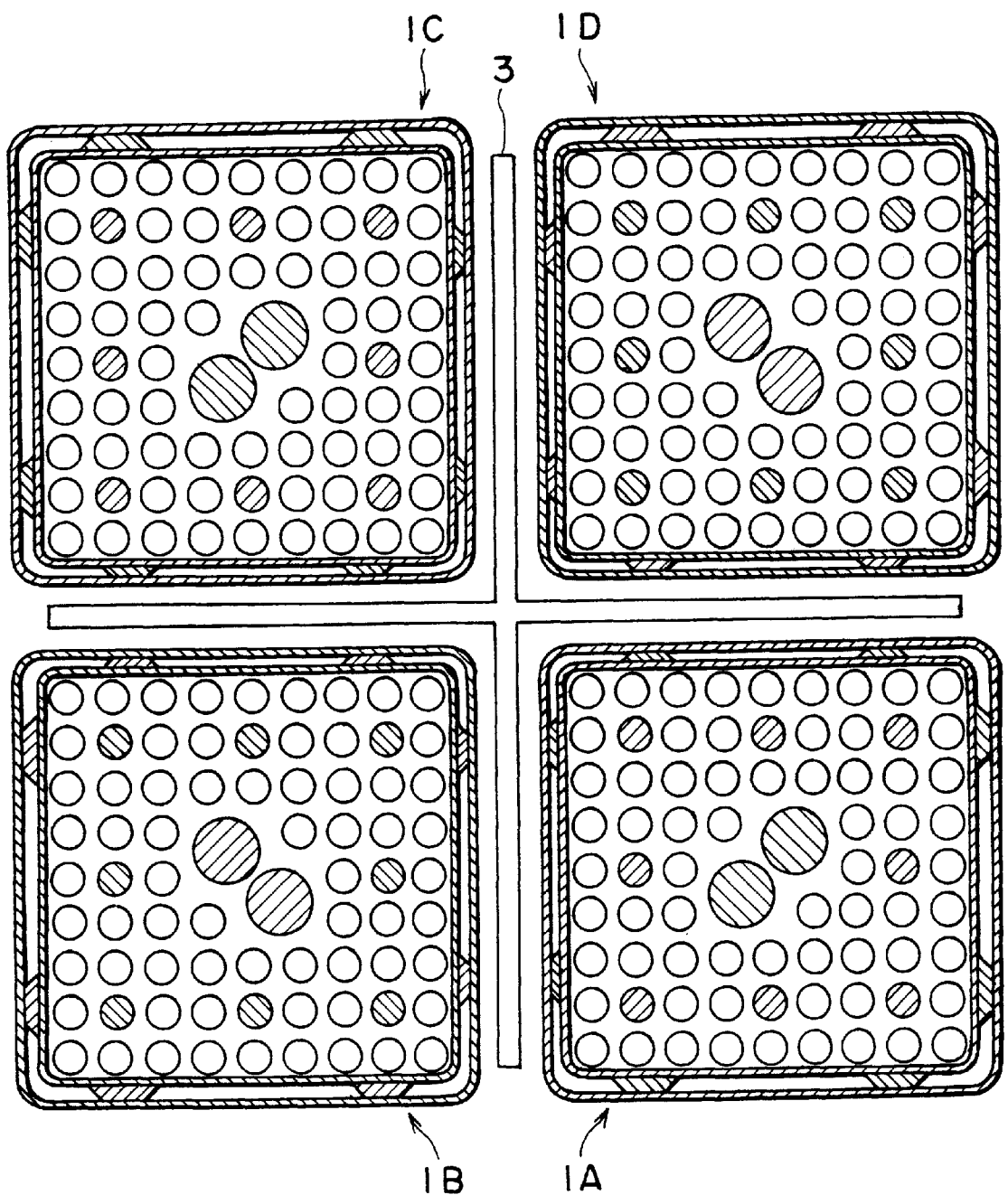

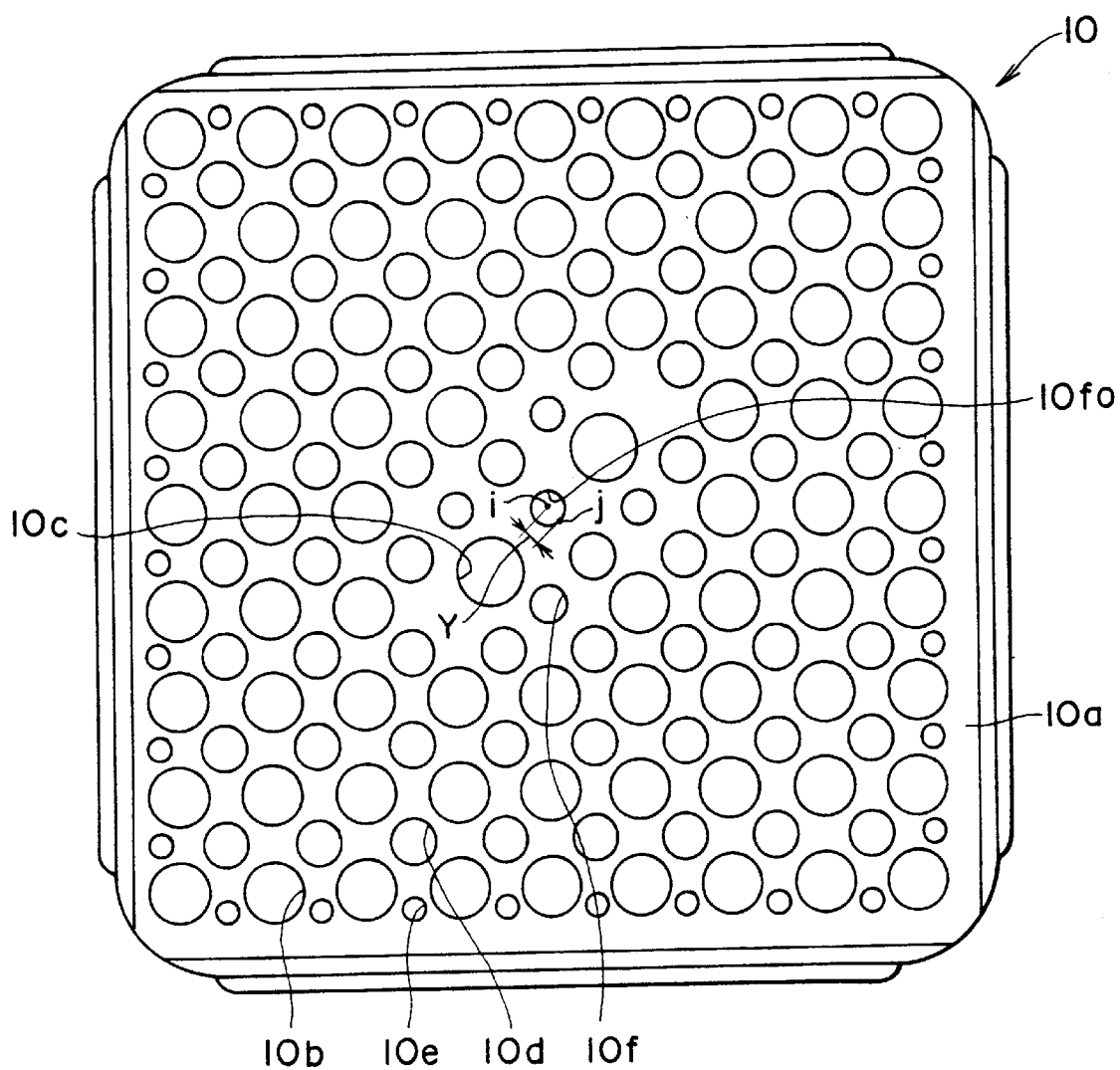

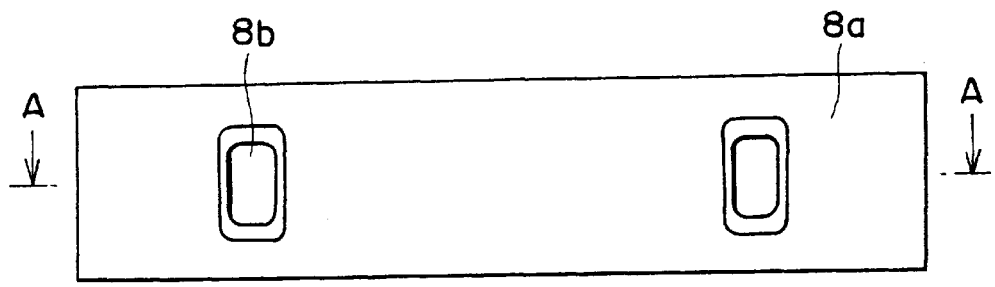
FIG. 7A
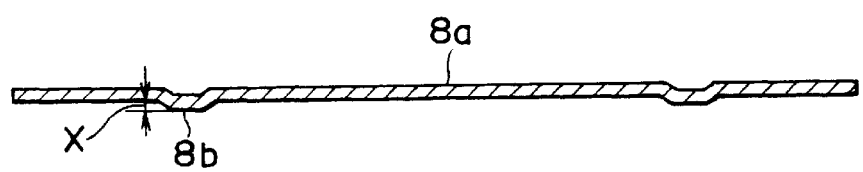
FIG. 7B
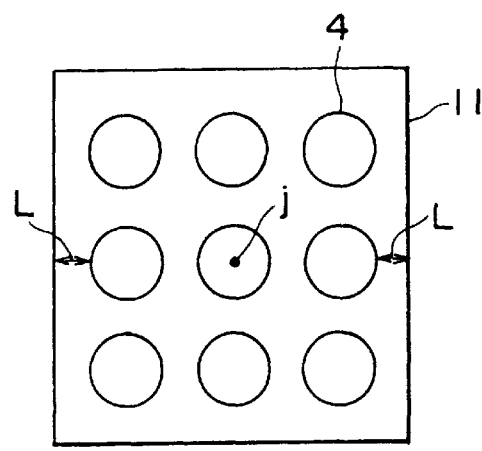
FIG. 8A
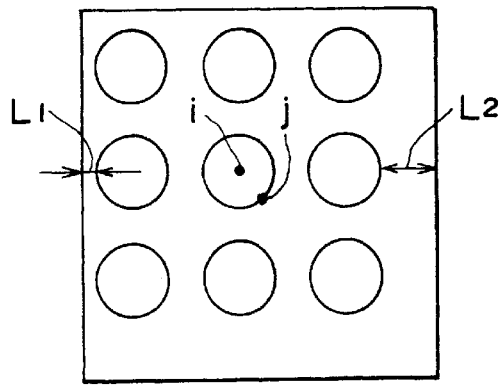
FIG. 8B
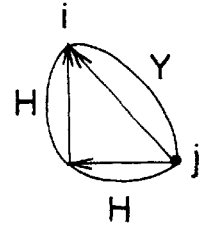

FUEL ASSEMBLY AND REACTOR CORE AND FUEL SPACER AND CHANNEL BOX

BACKGROUND OF THE INVENTION

The present invention relates to a fuel assembly used for a core of a D-lattice type boiling water reactor (hereinafter, referred to as a "BWR"), a reactor core using the fuel assembly, and a fuel spacer and a channel box used for the fuel assembly.

A gap structure between fuel assemblies, called a D-lattice structure, has been used for a core of a BWR. In the D-lattice core, a gap between the adjacent two of the fuel assemblies on the side where a control rod for power adjustment is inserted (on the control rod side) is wider than a gap between the adjacent two of the fuel assemblies on the side where the control rod is not inserted (on the anti-control rod side).

For a BWR, water in a core acts as a coolant and a neutron moderator. In general, the moderating action for neutrons becomes large in a region in which water entirely, continuously exists, and accordingly, water between fuel assemblies plays a large role for moderating neutrons.

One important factor associated with a reactor core is a linear heat generation rate. The maximum linear heat generation rate, which is the maximum value among the linear heat generation rates in a reactor, becomes important for design of the reactor. If the maximum linear heat generation rate becomes excessively large, the center temperature of the corresponding fuel rod becomes excessively high. In this case, there is a possibility that the thermal integrity of fuel pellets and a cladding tube constituting the fuel rod cannot be ensured. From the viewpoint of the safety of a reactor, a specific limited value of the maximum linear heat generation rate is determined. To keep a thermal margin state of a reactor, the maximum linear heat generation rate may be desirable to be made as small as possible.

One important factor associated with a fuel assembly is a fuel assembly critical power. In a core of a BWR, water flows in the lower portion of a fuel assembly, being boiled while flowing in the vicinity of fuel rods, and flows out of the upper portion of the fuel assembly. It may be considered that, at the upper portion of the fuel assembly, the rate of steam becomes large and the surfaces of the fuel rods are covered with liquid films. As the power of the fuel assembly is increased, the liquid film on the surface of any one of the fuel rods is initially lost by evaporation. The power at the time when the liquid film is initially lost is called the critical power. The critical power varies depending on the flow rate of coolant flowing through the fuel assembly. A reactor is operated while it is usually checked that the power of each of the fuel assemblies is less than the critical power.

Taking into account the above-described circumstances, a fuel assembly has been designed such that a suitable fuel enrichment distribution is set by preparing a plurality of kinds of fuel pellets or a suitable concentration distribution of burnable poison added to fuel rods is set, to make small a "relative axial peaking factor of a fuel assembly" or a "local peaking factor" which is the relative power peaking of each fuel rod in a cross section of the fuel assembly, thereby improving the critical power characteristic, and enhancing the safety margin and fuel economy of the reactor.

In a D-lattice core, as described above, there is a difference between a gap between the adjacent two of the fuel assemblies on the control rod side and a gap between the adjacent two of the fuel assemblies on the anti-control rod side. During usual operation, since most of the control rods are pulled out, the effect of moderating neutrons on the side where a gap between the adjacent two of the fuel assemblies is wide (on the control rod side) is larger than that on the side where a gap between the adjacent two of the fuel assemblies is narrow (on the anti-control rod side). When fuel assemblies are loaded in the D-lattice core, the power obtained from a fuel rod near a wide gap between the fuel assemblies (on the control rode side) is different from that obtained from a fuel rod near a narrow gap between the fuel assemblies (on the anti-control rode side). Accordingly, the value of the local peaking factor becomes relatively larger and thereby the maximum linear heat generation rate tends to be made larger. As a result, the above-described fuel enrichment distribution or the concentration distribution of burnable poison must be finely set, so that the degree of freedom in design of fuel assemblies is reduced.

To solve the above problem, the structure called a C-lattice has been proposed. In the C-lattice core, since the gap between the fuel assemblies on the control rod side is equal to that on the anti-control rod side, the degree of freedom in design of the C-lattice core becomes larger than that of the D-lattice core. To be more specific, in the C-lattice core, it is possible to relatively easily obtain the optimum structure in terms of energy efficiency. For example, the discharge exposure of fuel (energy obtainable from fuel in a unit weight) in the C-lattice core can be larger several percentage than that in the D-lattice core. In this way, the C-lattice core is superior to the D-lattice core in terms of fuel economy.

However, since there have been a number of functioning D-lattice cores, attempts have been made to improve these D-lattice cores for enhancing the fuel economies thereof. One of such prior arts has been disclosed in Japanese Patent No. 2791132. The prior art provides a fuel assembly for a D-lattice core including fuel rods placed in a square lattice array of 9×9 (9-rows/9-columns), in which the fuel rod pitch is reduced, and a distance between the outermost fuel rod and a channel box on the control rode side is made smaller than a distance between the outermost fuel rod and a channel box on the anti-control rode side, whereby a difference in gap between fuel assemblies on the control rod side and the anti-control rod side is made small. With this configuration, it is possible to make the core characteristic of such a D-lattice core close to that of a C-lattice core while adopting the same fuel rods and control rod drive mechanism as those having been used in the conventional D-lattice core.

The above-described prior art D-lattice core, however, has the following problem. Since the fuel rod pitch becomes small, cooling water less flows between the fuel rods, to reduce the heat removal performance by cooling water. As a result, it is difficult to ensure the thermal margin at the same linear heat generation rate. To be more specific, the thermal margin of the fuel assemblies in the D-lattice core according to the above-described prior art is made smaller than that of the fuel assemblies in the conventional D-lattice core.

Another problem of the above-described prior art D-lattice core is as follows: namely, in general, fuel rods and water rods placed in a square lattice array are bundled with fuel spacers at a plurality of axial positions and the fuel spacers each have holding members (for example, cylindrical members) for holding the fuel rods and water rods such that they are spaced from each other at specific gaps, and therefore, if the fuel rod pitch is changed, the pitch of the holding members must be correspondingly changed. In other words, according to the prior art D-lattice core, the existing fuel spacers cannot be used and new fuel spacers must be used.

SUMMARY OF THE INVENTION

An object of the present invention is to provide a fuel assembly for a D-lattice core, which is capable of achieving the fuel economy comparable to that of a C-lattice core without reducing the thermal margin, and of using the existing fuel spacers.

(1) The present invention provides a fuel assembly including a plurality of fuel rods placed in a square lattice array of 9-rows/9-columns and at least one water rod, wherein the fuel rod pitch is in a range of 14.15 mm to 14.65 mm; and means for offsetting and holding a fuel bundle composed of the fuel rods and the water rod is provided in such a manner that the center in a cross section (cross section center) of the fuel bundle is offset from the center in a cross section of a lower tie plate toward the channel fastener side.

In this document, "fuel bundle" is not the same as "fuel assembly". "Fuel bundle" includes the fuel rods and the water rod(s), but does not include the channel box, and so on.

In a D-lattice core, upon arrangement of fuel assemblies, a gap between the adjacent two of the fuel assemblies on the control rod side (channel fastener side) is wider than a gap between the adjacent two of the fuel assemblies on the anti-control rod side (anti-channel fastener side). Accordingly, a continuous water region on the channel fastener side on which the gap between the fuel assemblies is wide is larger than that on the anti-channel fastener side on which the gap between the fuel assemblies is narrow, so that the effect of moderating neutrons on the channel fastener side is larger than that on the anti-channel fastener side. As a result, on the channel fastener side, the power obtained from a fuel rod becomes relatively large and thereby the local peaking factor tends to become relatively large.

According to the present invention, the center in a cross section of the fuel bundle is offset toward the channel fastener side by the offsetting/holding means. To be more specific, it is possible to get almost the same effect as follows, the continuous water region on the anti-channel fastener side is made large and simultaneously the continuous water region on the channel fastener side is made small. With this configuration, it is possible to reduce the difference between the continuous water regions on both the channel fastener side and the anti-channel fastener side. This makes it possible to lower the difference in power of fuel rods between the channel fastener side and the anti-channel fastener side, and hence to reduce the local peaking factor. In this way, according to the D-lattice core using the fuel assembly of the present invention, it is possible to obtain a core characteristic comparable to that of a C-lattice core.

(2) The present invention also provides a fuel assembly including a plurality of fuel rods placed in a square lattice array of 9-rows/9-columns and at least one water rod, wherein the fuel rod pitch is in a range of 14.15 mm to 14.65 mm; and means for offsetting and holding a fuel bundle composed of the fuel rods and the water rod is provided in such a manner that the center in a cross section of the fuel bundle is offset a value $Y \geq 2^{-3/2}$ mm from the center in a cross section of a lower tie plate toward the channel fastener side.

When the center in a cross section of the fuel bundle is offset a value $Y \geq 2^{-3/2}$ mm toward the channel fastener side, the fuel bundle is moved by 0.25 mm or more in the row or column direction of the square lattice array. With this configuration, the local peaking factor can be reduced by at least 1% or more as compared with the prior art fuel assembly in which the fuel bundle is not offset, and accordingly, it is possible to certainly obtain a core characteristic comparable to that of a C-lattice core, and hence to improve the fuel economy.

(3) In the configuration described in the item (2), the value Y may be preferably in a range of $7 \times 2^{-1/2}$ mm $\geq Y \geq 2^{-3/2}$ mm.

In the case of the fuel assembly including fuel rods placed in a square lattice array of 9-rows/9-columns, as described in "nuclear engineering INTERNATIONAL", vol. 43, No. 530 (September, 1988; Wilmington Business Publication) p12–31, the diameter of a fuel rod is generally about 11.0 mm. To ensure the thermal margin, it is required to set a gap between the adjacent fuel rods at about 3 mm. In this case, a distance between both ends of the nine pieces of the fuel rods becomes 123 mm (11.0×9+3×(9−1)=123), and the inner width W of a channel box which surrounds the fuel bundle is about 134 mm.

Accordingly, the remaining distance between the fuel rods positioned at the outermost periphery of the square lattice array and the inner peripheral surface of the channel box on both sides is 11 mm at maximum (134−123=11). Meanwhile, a gap of 2 mm or more is generally required between the fuel rod positioned at the outermost periphery of the square lattice array and the inner peripheral surface of the channel box because a band of each fuel spacer must be inserted in the gap. It is generally required to give the same gap from the viewpoint of the thermal margin.

Accordingly, the actually usable remaining distance between the fuel rods positioned at the outermost periphery of the square lattice array and the inner peripheral surface of the channel box for offsetting the fuel bundle becomes 7 mm (11−2×2=7) To be more specific, when the fuel bundle is offset on the channel fastener side, the actually movable maximum distance in the row or column direction of the square lattice array becomes 7 mm. According to the present invention, on the basis of the above knowledge, the center in a cross section of the fuel bundle is offset a value $Y \leq 7 \times 2^{-1/2}$ mm on the channel fastener side. At this time, the movement distance of the fuel bundle in the row or column direction of the square lattice array becomes a value of 7 mm or less.

(4) The present invention provides a fuel assembly including a plurality of fuel rods placed in a square lattice array of 9-rows/9-columns and at least one water rod, wherein the fuel rod pitch is in a range of 14.15 mm to 14.65 mm; each of fuel spacers includes a plurality of tabs for offsetting and holding a fuel bundle composed of the fuel rods and the water rod in such a manner that the center in a cross section of the fuel bundle is offset from the center in a cross section of a lower tie plate toward the channel fastener side, the tabs being provided in such a manner as to project outwardly from the outer periphery of said fuel spacer; and a distance L1 between the leading end of one of said plurality of tabs positioned on the channel fastener side and one of said fuel rods positioned at the outermost periphery of said square lattice array, and a distance L2 between the leading end of one of said plurality of tabs positioned on the anti-channel fastener side and one of said fuel rods positioned at the outermost periphery of said square lattice array are determined in such a manner as to satisfy a relationship of L2−L1≧0.5 mm.

(5) In the configuration described in the item (4), said distances L1 and L2 may be preferably determined in such a manner as to satisfy a relationship of 7.0 mm≧L2−L1≧0.5 mm.

(6) The present invention also provides a fuel assembly including a plurality of fuel rods placed in a square lattice array of 9-rows/9-columns, at least one water rod, and a channel box provided in such a manner as to surround a fuel bundle composed of the fuel rods and the water rod, wherein the fuel rod pitch is in a range of 14.15 mm to 14.65 mm; the inner width of said channel box is in a range of 133.5 mm to 134.5 mm; and means for offsetting and holding the fuel bundle is provided in such a manner that the center in a cross section of the fuel bundle is offset from the center in a cross section of the channel box toward the channel fastener side.

(7) The present invention also provides a fuel assembly including a plurality of fuel rods placed in a square lattice array of 10-rows/10-columns and at least one water rod, wherein the fuel rod pitch of is in a range of 12.65 mm to 13.15 mm; and means for offsetting and holding a fuel bundle composed of the fuel rods and the water rod is provided in such a manner that the center in a cross section of said fuel bundle is offset from the center in a cross section of a lower tie plate toward said channel fastener side.

(8) The present invention also provides a fuel assembly including a plurality of fuel rods placed in a square lattice array of 10-rows/10-columns and at least one water rod, wherein the fuel rod pitch is in a range of 12.65 mm to 13.15 mm; and means for offsetting and holding a fuel bundle composed of the fuel rods and the water rod is provided in such a manner that the center in a cross section of said fuel bundle is offset a value $Y \geq 2^{-3/2}$ mm from the center in a cross section of said lower tie plate toward said channel fastener side.

(9) In the configuration described in the item (8), said value Y may be preferably in a range of $7 \times 2^{-1/2}$ mm $\geq Y \geq 2^{-3/2}$ mm.

In the case of the fuel assembly including fuel rods placed in a square lattice array of 10-rows/10-columns, as described in "nuclear engineering INTERNATIONAL", vol. 43, No. 530 (September, 1988; Wilmington Business Publication) p12–31, the diameter of a fuel rod is generally about 10.05 mm. To ensure the thermal margin, it is required to set a gap between the adjacent fuel rods at about 2.5 mm. In this case, a distance between both ends of the ten pieces of the fuel rods becomes 123.0 mm (10.05×10+2.5×(10−1)=123.0), and the inner width W of a channel box which surrounds the fuel bundle is about 134 mm.

Accordingly, the remaining distance between the fuel rods positioned at the outermost periphery of the square lattice array and the inner peripheral surface of the channel box on both sides is 11 mm at maximum (134−123=11). Meanwhile, a gap of 2 mm or more is generally required between the fuel rod positioned at the outermost periphery of the square lattice array and the inner peripheral surface of the channel box. Accordingly, the actually usable remaining distance between the fuel rods positioned at the outermost periphery of the square lattice array and the inner peripheral surface of the channel box for offsetting the fuel bundle becomes 7 mm (11−2×2=7). According to the present invention, on the basis of the above knowledge, the center in a cross section of the fuel bundle is offset a value $Y \leq 7 \times 2^{-1/2}$ mm on the channel fastener side. At this time, the movement distance of the fuel bundle in the row or column direction of the square lattice array becomes a value of 7 mm or less.

(10) The present invention also provides a fuel assembly including a plurality of fuel rods placed in a square lattice array of 10-rows/10-columns, at least one water rod, fuel spacers for holding a plurality of axial positions of a fuel bundle composed of the fuel rods and the water rod, wherein the pitch of said plurality of fuel rods is in a range of 12.65 mm to 13.15 mm; each of said fuel spacers includes a plurality of tabs for offsetting and holding said fuel bundle in such a manner that the center in a cross section of said fuel bundle is offset from the center in a cross section of a lower tie plate toward said channel fastener side, said tabs being provided in such a manner as to project outwardly from the outer periphery of said fuel spacer; and a distance L1 between the leading end of one of said plurality of tabs positioned on the channel fastener side and one of said fuel rods positioned at the outermost periphery of said square lattice array, and a distance L2 between the leading end of one of said plurality of tabs positioned on the anti-channel fastener side and one of said fuel rods positioned at the outermost periphery of said square lattice array are determined in such a manner as to satisfy a relationship of L2−L1≧0.5 mm.

(11) In the configuration described in the item (10), said distances L1 and L2 may be preferably determined in such a manner as to satisfy a relationship of 7.0 mm≧L2−L1≧0.5 mm.

(12) The present invention also provides a fuel assembly including a plurality of fuel rods placed in a square lattice array of 10-rows/10-columns, at least one water rod, and a channel box provided in such a manner as to surround a fuel bundle composed of the fuel rods and the water rod, wherein the pitch of said plurality of fuel rods is in a range of 12.65 mm to 13.15 mm; the inner width of said channel box is in a range of 133.5 mm to 134.5 mm; and means for offsetting and holding said fuel bundle is provided in such a manner that the center in a cross section of said fuel bundle is offset from the center in a cross section of said channel box toward said channel fastener side.

(13) The present invention also provides a reactor core including a plurality of fuel assemblies each of which includes a plurality of fuel rods placed in a square lattice array of 9-rows/9-columns, and at least one control rod inserted among said fuel assemblies, said plurality of fuel assemblies being configured such that a gap between the adjacent two of said plurality of fuel rods on the control rod side is larger than a gap between the adjacent two of said plurality of fuel rods on the anti-control rod side, wherein at least one of said plurality of fuel assemblies is configured such that the pitch of said plurality of fuel rods is in a range of 14.15 mm to 14.65 mm; the inner width of a channel box is in a range of 133.5 mm to 134.5 mm; and means for offsetting and holding a fuel bundle is provided in such a manner that the center in a cross section of said fuel bundle is offset from the center in a cross section of said channel box toward the channel fastener side.

(14) The present invention also provides a reactor core including a plurality of fuel assemblies each of which includes a plurality of fuel rods placed in a square lattice array of 9-rows/9-columns, and at least one control rod inserted among said fuel assemblies, said plurality of fuel assemblies being configured such that a gap between the adjacent two of said plurality of fuel rods on the control rod side is larger than a gap between the adjacent two of said plurality of fuel rods on the anti-control rod side, wherein at least one of said plurality of fuel assemblies is configured such that the pitch of said plurality of fuel rods is in a range of 14.15 mm to 14.65 mm; the inner width of a channel box is in a range of 133.5 mm to 134.5 mm, and means for offsetting and holding a fuel bundle is provided in such a manner that the center in a cross section of said fuel bundle is offset from the center in a cross section of said channel box toward the control rod side under a condition that a distance L1 between the inner side surface of said channel box positioned on the control rod side and one of said fuel rods positioned at the outermost periphery of said square lattice array and a distance L2 between the inner side surface of said channel box positioned on the anti-control rod side and one of said fuel rods positioned at the outer periphery of said square lattice array satisfy a relationship of L2–L1≧0.5 mm.

(15) The present invention provides a reactor core including a plurality of fuel assemblies each of which includes a plurality of fuel rods placed in a square lattice array of 10-rows/10-columns, and at least one control rod inserted among said fuel assemblies, said plurality of fuel assemblies being configured such that a gap between the adjacent two of said plurality of fuel assemblies on the control rod side is larger than a gap between the adjacent two of said plurality of fuel assemblies on the anti-control rod side, wherein at least one of said plurality of fuel assemblies is configured such that the pitch of said plurality of fuel rods is in a range of 12.65 mm to 13.15 mm; the inner width of a channel box is in a range of 133.5 mm to 134.5 mm; and means for offsetting and holding a fuel bundle is provided in such a manner that the center in a cross section of said fuel bundle is offset from the center in a cross section of said channel box toward said channel fastener side.

(16) The present invention also provides a reactor core including a plurality of fuel assemblies each of which includes a plurality of fuel rods placed in a square lattice array of 10-rows/10-columns, and at least one control rod inserted among said fuel assemblies, said plurality of fuel assemblies being configured such that a gap between the adjacent two of said plurality of fuel assemblies on the control rod side is larger than a gap between the adjacent two of said plurality of fuel assemblies on the anti-control rod side, wherein at least one of said plurality of fuel assemblies is configured such that the pitch of said plurality of fuel rods is in a range of 12.65 mm to 13.15 mm; the inner width of a channel box is in a range of 133.5 mm to 134.5 mm, and means for offsetting and holding a fuel bundle is provided in such a manner that the center in a cross section of said fuel bundle is offset from the center in a cross section of said channel box toward the control rod side under a condition that a distance L1 between the inner side surface of said channel box positioned on the control rod side and one of said fuel rods positioned at the outermost periphery of said square lattice array and a distance L2 between the inner side surface of said channel box positioned on the anti-control rod side and one of said fuel rods positioned at the outer periphery of said square lattice array satisfy a relationship of L2–L1≧0.5 mm.

(17) The present invention provides a fuel spacer for holding a fuel bundle composed of a plurality of fuel rods placed in a square lattice array of n-rows/n-columns (n: integer) and at least one water rod, said fuel spacer including a band formed into a square shape, and a plurality of tabs projecting outwardly from the outer periphery of said band, wherein the height of those of said plurality of tabs positioned on one side with respect to a diagonal line of the square shape of said band is different from the height of those of said plurality of tabs positioned on the other side with respect to said diagonal line.

(18) The present invention also provides a channel box, formed into an approximately cylindrical shape having a square shape in transverse cross-section, for covering a fuel bundle composed of a plurality of fuel rods placed in a square lattice array of n-rows/n-columns (n: integer) and at least one water rod, said channel box including a plurality of tabs projecting inwardly from the inner periphery of the approximately cylindrical shape of said channel box, wherein the height of those of said plurality of tabs positioned on one side with respect to a diagonal line of the square cross-section of said channel box is different from the height of those of said plurality of tabs positioned on the other side with respect to said diagonal line.

BRIEF DESCRIPTION OF THE DRAWINGS

FIG. 1 is an enlarged horizontally sectional view showing a detailed structure of a fuel assembly according to a firth embodiment of the present invention;

FIG. 3 is an enlarged view of a portion shown in FIG. 2;

FIG. 6 is a top view showing a detailed structure of a lower tie plate;

FIG. 7A is a detailed side view of one of four sides of a band formed into a square shape and tabs provided thereon;

FIG. 7B is a sectional view taken on line A—A of FIG. 7A;

FIGS. 8A and 8B are views illustrating the principle of determining the offset amount of a fuel bundle;

DESCRIPTION OF THE PREFERRED EMBODIMENTS

Figure 2:
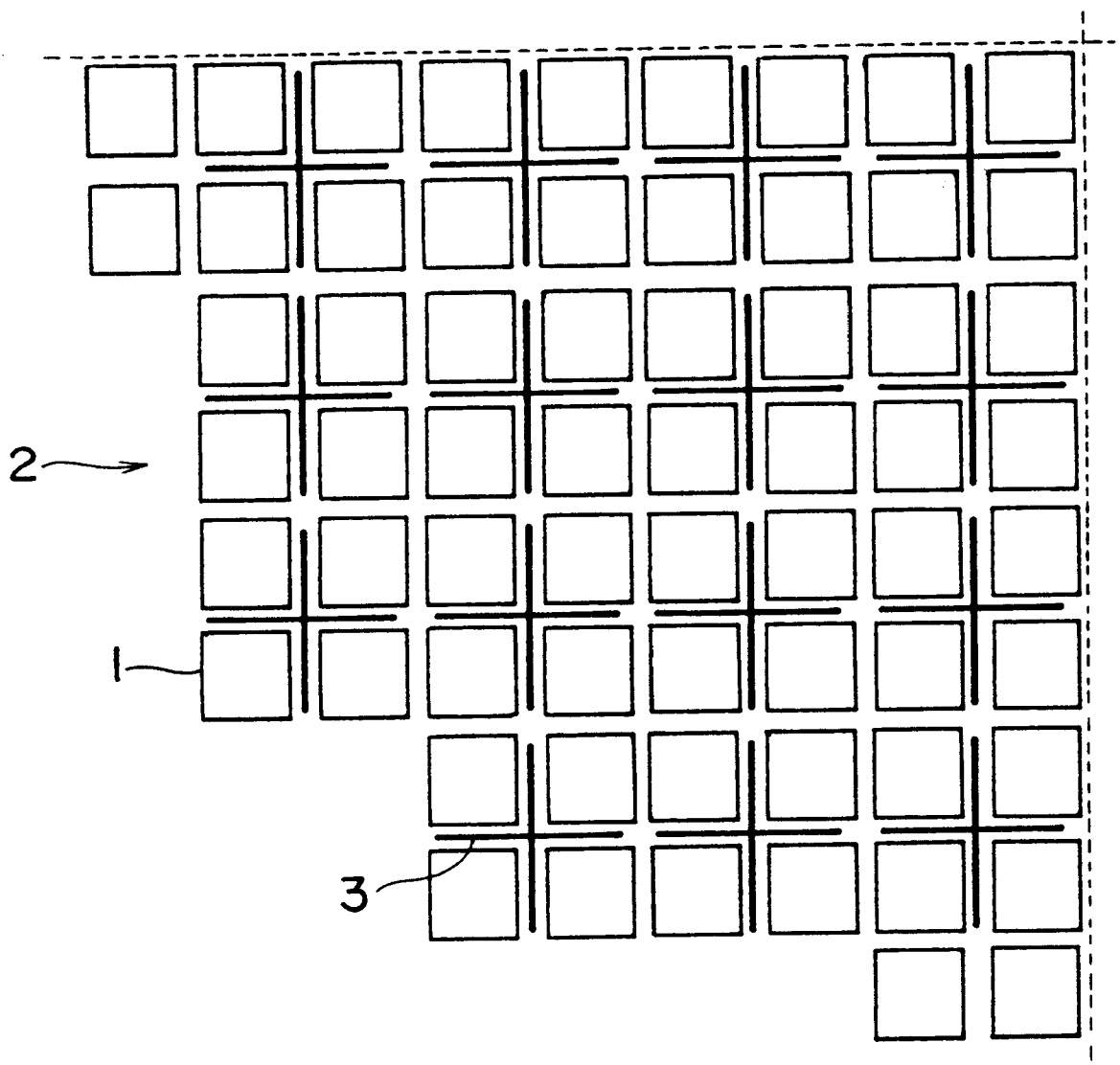
FIG. 2 is a horizontally transverse sectional view showing a partial schematic arrangement (symmetric quarter portion) of a boiling water reactor core in which the fuel assemblies shown in FIG. 1 are arranged.

Hereinafter, embodiments of the present invention will be described with reference to the drawings. A first embodiment of the present invention will be described with reference to FIGS. 1 to 16. FIG. 2 is a horizontally transverse sectional view showing a partial schematic arrangement (symmetric quarter portion) of a boiling water reactor core according to this embodiment, and FIG. 3 is a partial enlarged view of FIG. 2. Referring to FIGS. 2 and 3, a number of fuel assemblies 1 are arranged in a reactor pressure vessel (not shown), to constitute a core 2. In the core 2, each control rod 3 is inserted among the four adjacent fuel assemblies 1 placed in a square array. The core 2 is configured as a so-called D-lattice core, in which a gap between the fuel assemblies 1 on the control rod 3 side is larger than that on the anti-control rod 3 side.

FIG. 3 shows fuel assemblies 1A, 1B, 1C and 1D as one example of the four adjacent fuel assemblies placed in the square array. The control rod 3 is formed into an approximately cruciform in transverse cross-section. The fuel assemblies 1A to 1D are identical to each other in terms of structure but are different from each other in arrangement orientation. That is to say, the fuel assemblies 1A to 1D are point-symmetrically arranged around the axis of the cruciate control rod 3. The control rod 3 is inserted in such a manner as to be close to two sides of the square shape in transverse cross-section of each fuel assembly 1.

Figure 4:
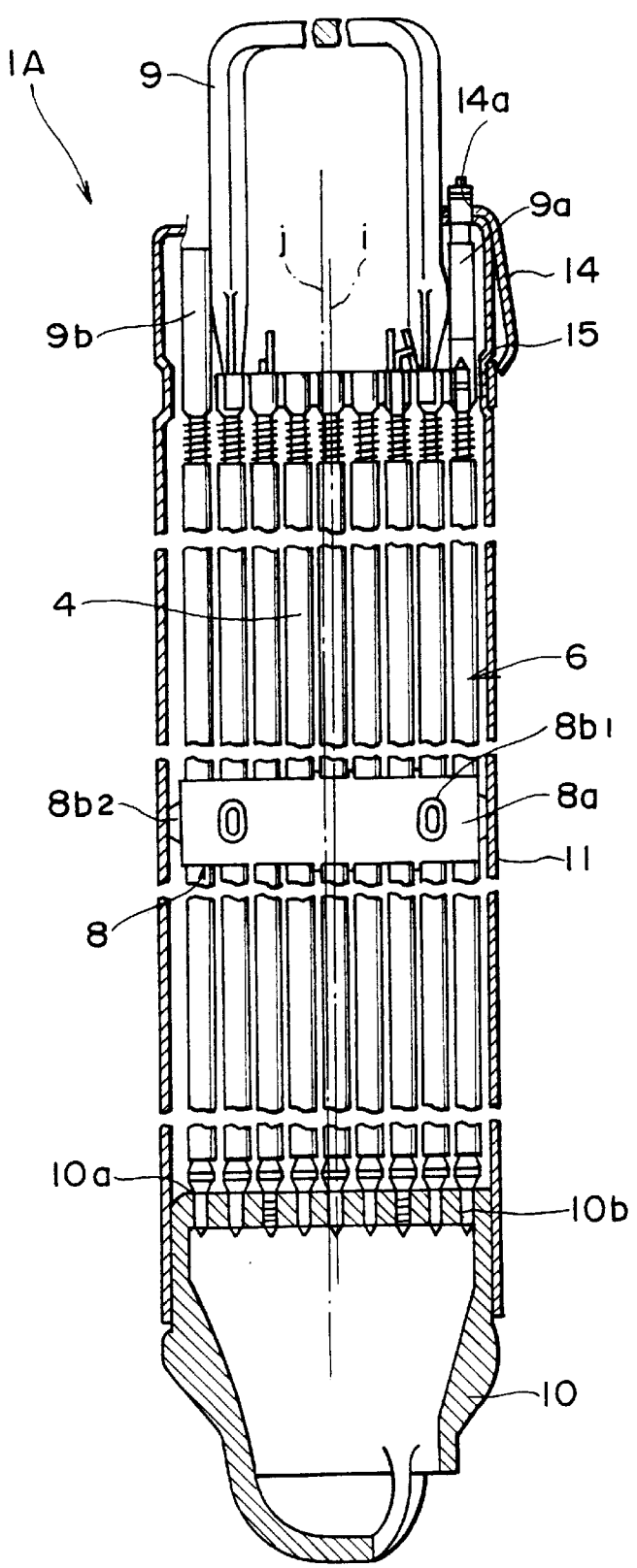
FIG. 4 is a vertical sectional view showing a detailed structure of the fuel assembly shown in FIG. 1.

FIG. 1 is a partial enlarged view of FIG. 3, showing a detailed structure of the fuel assembly 1A, and FIG. 4 is a vertical sectional view showing a detailed structure of the fuel assembly 1A shown in FIG. 1. Referring to FIGS. 1 and 4, the fuel assembly 1A includes a fuel bundle 6 composed of a number of fuel rods 4 and two water rods 5 (these rods are not shown in FIG. 4), fuel spacers 8, a upper tie plate 9, a lower tie plate 10, and a channel box 11.

The fuel bundle 6 includes, as shown in FIG. 1, the fuel rods 4 placed in a square lattice array of 9-rows/9-columns. The square lattice array of the fuel rods 4 is offset as a whole in the upward, leftward direction in FIG. 1 (toward a channel fastener to be described later, or toward the control rod 3). The "i" which is the center of the square lattice array of the fuel rods 4 is offset from the "j" which is the center in a cross section of the channel box 11, which is equal to the center in a cross section of the upper tie plate 9 and the lower tie plate 10, toward the channel fastener side or the control rod 3 side. The offset amount Y is set at $2^{-1/2}$ mm in the upward, leftward direction in FIG. 1. In other words, as shown in FIG. 1, the offset amount Y has an offset component of 0.5 mm in the upward direction and an offset component of 0.5 mm in the leftward direction. The means for offsetting and holding the square lattice array of the fuel rods 4 is configured by an insertion hole 14a of a channel fastener 14, fuel rod insertion holes 10b and water rod insertion holes 10c of the lower tie plate 10, and tabs 8b1 and 8b2 of each fuel spacer 8. These will be described in detail later one by one.

The fuel rod 4 contains fuel pellets. The fuel pellet is formed of a sintered body of uranium as a fissile material. The outside diameter d of each fuel rod is set at 11.2 mm. The fuel rod pitch p is set at 14.4 mm. In this embodiment, 74 pieces of the fuel rods 4 are placed in a square lattice array of 9-rows/9-columns. The 74 pieces of the fuel rods 4 are composed of usual fuel rods (long-length fuel rods) 4a and partial length fuel rods (short-length fuel rods, not shown in FIG. 4) 4b. The fuel active length (charging length of nuclear fuel) of the short-length fuel rod 4b is shorter than that of the long-length fuel rod 4a.

While not particularly shown and described, there are used a plurality of kinds of the fuel rods 4a which are different in enrichment distribution of uranium contained in pellets. The local peaking factor is flattened by suitably adjusting the fuel rod pitch 4a and 4b. Further, a suitable enrichment distribution in the axial direction is given for each the fuel rods 4a and 4b in order to flatten the power peaking in the axial direction (axial peaking factor). These configurations may be the same as those for the known fuel assembly of this type.

The two water rods 5 are arranged in the fuel assembly 1A at an approximately central portion having an area in which 7 pieces of the fuel rods 4 can be placed in a square lattice array of 3-rows/3-columns. While not particularly shown in detail, the water rods 5 are formed by hollow tubes having the known structure for forming a coolant flow passage so as to flatten a thermal neutron flux at the central area of the fuel assembly 1A.

Figure 5:
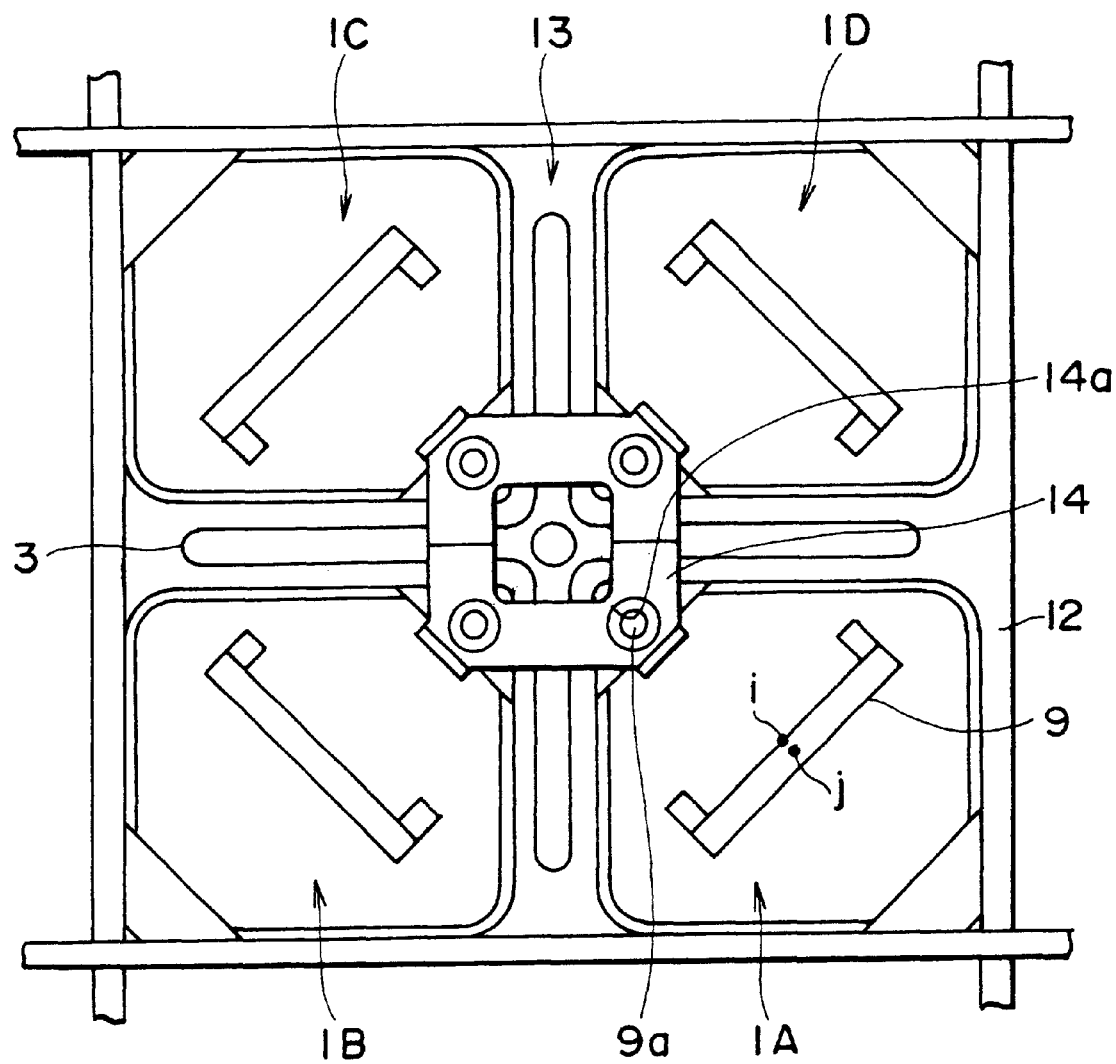
FIG. 5 is a top view showing a supporting structure in which upper portions of the fuel assemblies are supported by an upper lattice plate.

The upper tie plate 9 is used for supporting the upper end portion of the fuel bundle 6. Guide posts 9a and 9b are integrally formed on the upper tie plate 9 on the control rod 3 side and the anti-control rod 3 side, respectively. The upper tie plate 9 is supported by an upper lattice plate 12 (see the later figure, FIG. 5) via the guide post 9a in a state in which the lateral movement of the upper tie plate 9 is restricted by the upper lattice plate 12. FIG. 5 is a top view showing a supporting structure in which the upper portion of the fuel assembly 1A is supported by the upper lattice plate 12. For a clear understanding of the structure, the structure of supporting the four fuel assemblies 1A to 1D (see FIG. 3) with the control rod 4 put therebetween is shown in FIG. 5.

The upper lattice plate 12 has a lattice structure corresponding to the positions of the fuel assemblies 1 and the fuel rods 3 arranged in the core. To be more specific, as shown in FIG. 5, the upper lattice plate 12 has a number of lattices 13 each having a size surrounding one of the four fuel assemblies 1A, 1B, 1C and 1D. The four fuel assemblies 1A to 1D are provided under respective lattices 13. One control rod 3 is positioned among the four fuel assemblies 1A to 1D.

The leading end of the guide post 9a of each of the fuel assemblies 1A to 1D is inserted in one of the insertion holes 14a provided in the channel fastener 14, and is fixed to the channel fastener 14 with a fixture, typically, a bolt (not shown). At this time, each insertion hole 14a of the channel fastener 14 is formed at a position slightly offset from that of the prior art 9-rows/9-columns fuel assembly toward the corner side. With this offset of the insertion holes 14a of the channel fastener 14, as described above, the center in a cross section of the fuel bundle 6 is offset from the center in a cross section of the upper tie plate (center in a cross section of the channel box) toward the control rod side. The channel fastener 14 is connected to the channel box 11, whereby the channel box 11 is fixed to the fuel bundle 6 surrounded by the channel box 11.

The channel fastener 14 is provided for keeping constant gaps each being formed between the channel boxes 11 of the adjacent two of the fuel assemblies 1, thereby ensuring spaces in which the control rod 3 is to be inserted. Each of the guide posts 9b on the anti-control rod side is taken as a dummy for taking a balance in weight between the guide post 9a on the control rod 3 side and the same. In addition, a guard 15 is provided between the channel fastener 14 and each channel box 11 for preventing excessive deformation of the channel fastener 14.

The side surface, on which the channel fastener 14 is not provided, of the channel box 11 of each of the fuel assemblies 1A to 1D is supported by the upper lattice plate 12 (see FIG. 5). To be more specific, the above side surface of the channel box 11 is simply pressed to the upper lattice plate 12 by the elastic force of the channel fastener 14, to be thus supported by the upper lattice plate 12.

As shown in FIG. 4, the lower tie plate 10 supports the lower end of the fuel bundle 6. FIG. 6 is a top view showing a detailed structure of the lower tie plate 10. As shown in FIGS. 4 and 6, an upper surface 10a of the lower tie plate 10 has the fuel rod insertion holes 10b, the water rod insertion holes 10c, and coolant introduction holes 10d, 10e and 10f. In this embodiment, 74 pieces of the fuel rod insertion holes 10b are provided, and the lower end portions of the fuel rods 4 are inserted in and supported by the fuel rod insertion holes 10b; and two pieces of the water rod insertion holes 10c are provided, and the lower end portions of the water rods 5 are inserted in and supported by the water rod insertion holes 10c.

The fuel rod insertion holes 10b and the water rod insertion holes 10c are provided at the positions corresponding to those of the fuel rods 4 and the water rods 5 of the fuel bundle 6 shown in FIG. 1. To be more specific, the fuel rod insertion holes 10b and the water rod insertion holes 10c are also placed in the square lattice array of 9-rows/9-columns. The square lattice array of the fuel rod insertion holes 10b and the water rod insertion holes 10c is offset as a whole in the upward, leftward direction in FIG. 6, that is, toward the channel fastener 14 side or the control rod 3 side. More specifically, the center i in a cross section, which is equivalent to the center position of the coolant introduction hole $10f_0$ between the two water rod insertion holes 10c, of the square lattice array of the fuel rod insertion holes 10b and the water rod insertion holes 10c is offset from the center j in a cross section of the lower tie plate 10 in the upward, leftward direction in FIG. 6. The offset amount Y is, as described above, set at $2^{-1/2}$ mm in the upward, leftward direction in FIG. 6. This means that the offset component of the offset amount Y in the leftward direction in FIG. 6 is 0.5 mm and the offset component thereof in the upward direction in FIG. 6 is 0.5 mm.

As shown in FIGS. 1 and 4, the channel box 11 surrounds the outer periphery of the fuel bundle 6 to form an outer wall of the fuel assembly 1A. The inner width W of the channel box 11 is set at 134.1 mm.

The fuel spacers 8 are provided at a plurality of the axial positions of the fuel bundle 6. At each axial position of the fuel bundle 6, the fuel spacer 8 bundles the fuel rods 4 and the water rods 5 in such a manner that they are spaced at specific gaps. Accordingly, the center in a cross of the fuel spacers 8 is equal to the center i in a cross section of the fuel bundle 6. The fuel spacer 8 includes a band 8a and a plurality (eight in this embodiment) of tabs 8b projecting outwardly from the outer periphery of the band 8a. The fuel spacer 8 also includes the known cylindrical members and spring members (not shown in FIGS. 1 and 3). To be more specific, the cylindrical members of the number corresponding to that of the fuel rods 4 are provided. The fuel rods 4 are inserted in the cylindrical members and pressed to the side opposed to the cylindrical members by the spring members provided on the cylindrical members. The fuel rods 4 are thus supported in the cylindrical members while being restricted in their lateral movements by the spring members.

FIG. 7A is a side view showing a detailed structure of one of the four sides of the square-shaped band 8a and the tabs 8b provided thereon, and FIG. 7B is a sectional view taken on line A—A of FIG. 7A. The band 8a is a band-like member having a uniform thickness which is formed into a square shape. The tabs 8b are formed, typically, by extruding portions of the band 8a. The height of the tab 8b is designated by character X in FIG. 7B.

The tabs 8b are provided on the tab 8a at eight positions. Of these tabs 8b, the four tabs 8b1 are provided on the control rod side and the four tabs 8b2 are provided on the anti-control side with respect to a diagonal line of the square shape of the tab 8a (see FIG. 1). The height X2 of the tab 8b2 is different from the height X1 of the tab 8b1. The difference X2−X1 therebetween is set at 1 mm. By setting the difference X2−X1 at 1 mm, there can be realized the structure in which the center i in a cross section of the fuel bundle 6 is offset a value $Y=2^{-1/2}$ mm from the center j in a cross section of the channel box 11 on the control side, and more concretely, offset by 0.5 mm in the leftward direction and by 0.5 mm in the upward direction in FIG. 1. This will be more fully described with reference to FIGS. 1 and 8.

In the structure shown in FIG. 1, as described above, the thickness t of the band 8a is equalized over the entire peripheral length, and the center in a cross section of the fuel spacers 8 is the same as the center i in a cross section of the fuel bundle 6. Accordingly, a distance u between each fuel rod 4 positioned at the outermost periphery of the square lattice array and the band 8a is equalized over the entire periphery of the square lattice array. Letting the distance between the leading end of the tab 8b2 and each fuel rod 4 positioned at the outermost periphery of the square lattice array on the anti-control rod side be L2, and the distance between the leading end of the tab 8b1 and each fuel rod 4 positioned at the outermost periphery of the square lattice array on the control rod side be L1, the heights X2 and X1 of the tabs 8b2 and 8b1 are given by X2=L2−(t+u) and X1=L1−(t+u), and accordingly, the difference in height between the tabs 8b2 and 8b1 is expressed by X2−X1=L2−L1.

In the prior art non-offset structure, L2 is equal to L1, each of which is taken as L (L2=L1=L, see FIG. 8A). On the other hand, according to this embodiment, the fuel bundle 6 is offset up to the center i in a cross section. At this time, letting each of the leftward offset amount and the upward offset amount in FIG. 1 be H, the offset amount Y and the above distances L1 and L2 are given by $Y=H\times2^{-1/2}$ ($H=Y\times2^{-1/2}$), L1=L−H, and L2=L+H. Accordingly, referring to FIG. 8A, the difference L2−L1 in distance between the tabs 8b2 and 8b1 and the fuel rods 4 positioned at the outer periphery of the square lattice array becomes $L2-L1=2H=Y\times2^{-1/2}$. Here, since X2−X1=L2−L1, the following equation is given.

$$X2-X1=Y\times2^{-1/2} \tag{1}$$

Accordingly, by setting the difference X2−X1 at 1 mm, the offset amount Y can be set at $Y=2^{-1/2}$ mm.

The function of this embodiment will be described below.
(1) Reduction in Local Peaking Factor Due to Offset Structure In the D-lattice core 2, when the fuel assemblies 1 are arranged, a gap between the adjacent two of the fuel assemblies 1 on the control rod side (channel fastener side) is wider than that on the anti-control rod side (anti-fastener side). The continuous water region on the channel fastener side on which the gap between the fuel assemblies 1 is thus wide is larger than that on the anti-fastener side on which the gap between the fuel assemblies 1 is narrow, and accordingly, the effect of moderating neutrons on the channel fastener side becomes larger than that on the anti-fastener side. As a result, on the channel fastener side, the power obtained from the fuel rod 4 becomes relatively larger and thereby the local peaking factor tends to become larger.

In the fuel assembly 1A according to this embodiment, the channel box 11 is left as it is and the center in a cross section of the fuel bundle 6 is offset toward the channel fastener 14 side. To be more specific, it is possible to get almost the same effect as follows, the narrow gap between the fuel assemblies on the anti-channel fastener side is made wide and simultaneously the wide gap between the fuel assemblies on the channel fastener side is made narrow. With this configuration, it is possible to reduce the difference between the above two gaps on both the channel fastener side and the anti-channel fastener side, and hence to relieve the difference between the continuous water regions on both the channel fastener side and the anti-channel fastener side. This makes it possible to lower the difference in power of fuel rods between the channel fastener side and the anti-channel fastener side, and hence to reduce the local peaking factor. In this way, according to the D-lattice core using the fuel assembly of the present invention, it is possible to obtain a core characteristic comparable to that of a C-lattice core and hence to achieve the fuel economy comparable to that of the C-lattice core.

Since the local peaking factor can be reduced, the maximum value of the powers of the fuel rods 4 can be reduced. For example, when the local peaking factor is reduced by 5%, the maximum linear heat generation rate of the fuel rods 4 can be reduced by 5%. Accordingly, it is possible to increase the critical power obtainable from one fuel assembly 1A, and hence to increase the thermal margin of the fuel assembly 1A if the power of the core 2 is fixed at a certain value and increase the power of the core 2 if the thermal margin is fixed at a certain value.

The above-described function of the fuel assembly in this embodiment will be more fully described below. During usual operation, water in the fuel assembly 1 (excluding water in the water rods 5) is in a mixed state of steam and liquid. At this time, the volume ratio of steam in the fuel assembly 1 is about 40% in average. Meanwhile, the gap between the fuel assemblies 1 is basically filled with only water in the liquid state. That is to say, the volume ratio of steam in the gap between the fuel assemblies 1 is 0%. Under each of the above conditions (in the gap between the fuel assemblies 1 and in the fuel assembly 1), the volume density of hydrogen atoms in water mainly contributing to moderation of neutrons is calculated at 70 atm (about 7 MPa) used for usual operation of the boiling water reactor, and the calculated values under both the conditions are compared with each other. Consequently, assuming that the calculated volume density of hydrogen atoms in the gap between the fuel assemblies 1 (volume ratio of steam: 0%) is taken as 1, the calculated volume density of hydrogen atoms in the fuel assembly 1 (volume ratio of steam: 40%) becomes about 0.6. Accordingly, the effect of moderating neutrons obtained by offsetting the fuel bundle by H=1 mm in the leftward direction (or upward direction) in FIG. 1 is substantially equal to the effect of moderating neutrons obtained by reducing the gap between the fuel assemblies by 0.6 mm.

It may be considered that the critical power be reduced by offsetting the fuel bundle. To be more specific, since the gap between the inner side of the channel box 11 and the fuel rod 4 positioned at the outermost periphery becomes wider on the side opposed to the offset side, a larger amount of water flows in such a wider gap, causing a possibility that the amount of water directly contributing to cooling of the fuel rods 4 is reduced. However, if the gap is in the order of several mm, the area of the gap is sufficiently small with respect to the area of the total flow passage of water in the fuel assembly 1A. Also, while the critical power generally has an approximately one-to-one relationship with local peaking factor, the critical power has no one-to-one relationship with the flow rate of water contributing to cooling. Accordingly, even if the amount of water is reduced by 5%, the critical power is changed only by about 2–3%. As a result, in actual, it may be considered that the critical power is not reduced by offsetting the fuel bundle.

To solve the non-uniformity of flow of water, the following measure may be adopted. Namely, the flow passage between the channel box 11 and the fuel rod positioned at the outermost periphery, which is widened by offsetting the fuel bundle, may be made narrow by providing a number of tabs on the inner side of the channel box 11 facing to the wide flow passage. Tabs may be additionally provided on the lower end or upper end of the band 8a of the fuel spacer 8 facing to the wide flow passage. In this case, the heights of the tabs must be larger than the heights of the tabs 8b1 and 8b2. The thickness of the portion, facing to the wide flow passage, of the channel box 11, may be increased; or a structural member may be additionally provided in the wide flow passage. With these configurations, it is possible to reduce the amount of water flowing in the wide flow passage.

(2) Certain Reduction in Local Peaking Factor Due to Setting of Offset Amount

Figure 9:
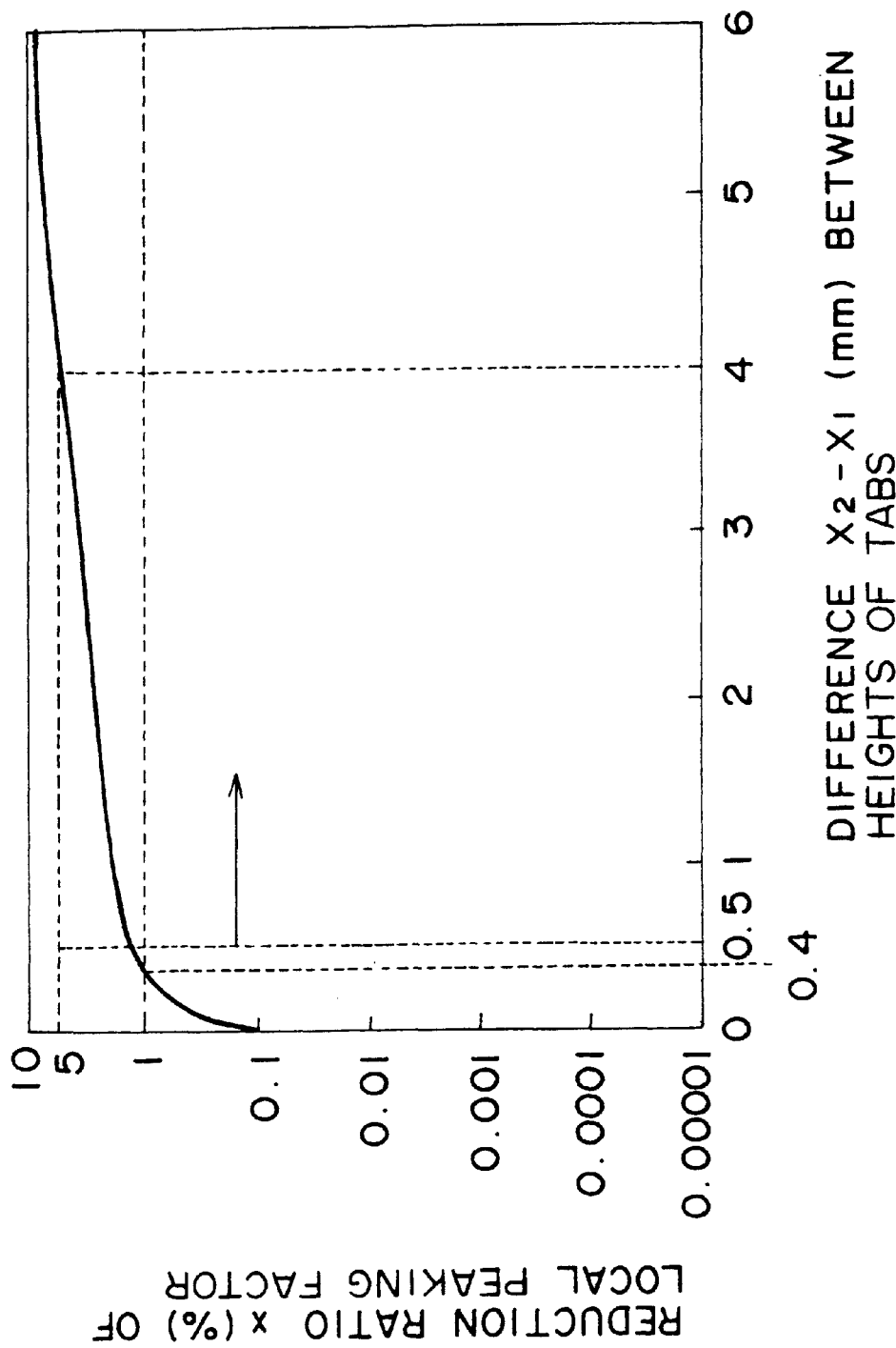
FIG. 9 is a graph showing a change in local peaking factor depending on the offset amount of a fuel bundle of the fuel assembly shown in FIG. 1.

The present inventors have examined, by numerical analysis, a relationship between the offset amount Y and the effect of reducing the local peaking factor, and obtained a result shown in FIG. 9. FIG. 9 is a graph showing a change in local peaking factor depending on a change in offset amount Y for the fuel assembly 1A in this embodiment. In this figure, the ordinate designates a relative value of the local peaking factor, which value represents a reduction ratio x% on the basis of the local peaking factor upon the offset amount Y=0 in which the center i in a cross section of the fuel bundle 6 is overlapped to the center j in a cross section of the channel box 11; and the abscissa designates a difference between the heights of the spacer tabs 8b1 and 8b2 directly related to the offset amount Y ($X2-X1=Y \times 2^{-1/2}$, see the above-described equation 1).

Referring to FIG. 9, as the difference X2−X1 starts to be increased from zero, the reduction ratio x% of the local peaking factor is rapidly increased, and when the difference X2−X1 becomes 0.4 mm, the reduction ratio x% becomes 1%. In a region in which the difference X2−X1 is more than 0.5 mm, the incremental rate of the reduction ratio x% of the local peaking factor is lowered. After that, the reduction ratio x% of the local peaking factor is gradually saturated even if the difference X2−X1 is further increased, and when the difference X2−X1 becomes 4 mm, the reduction ratio x% becomes 5%.

On the basis of the above result, the present inventors have decided that in order to ensure the effect of reducing the local peaking factor and hence to improve the fuel economy, the difference X2−X1 may be preferably set at a value of 0.5 mm or more (X2−X1≧0.5 mm), which is equivalent to $Y \geq 2^{-3/2}$ mm in the above-described equation (1).

Figure 10:
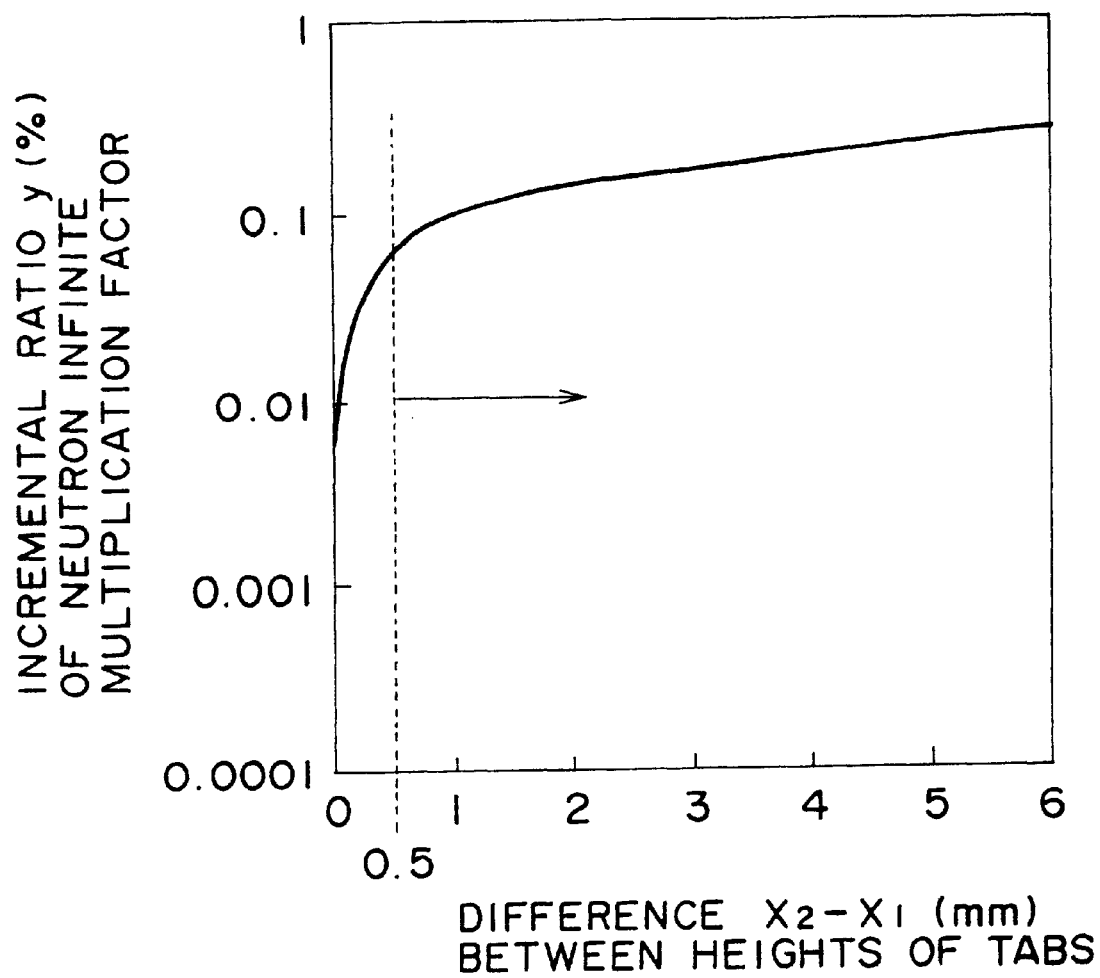
FIG. 10 is a graph showing a change in incremental ratio of a neutron infinite multiplication factor depending on the offset amount of a fuel bundle of the fuel assembly shown in FIG. 1.

The present inventors have further examined, by numerical analysis, a relationship between the offset amount Y and the average neutron infinite multiplication factor of the fuel assembly, and obtained a result shown in FIG. 10. The neutron infinite multiplication factor is an indicator for deciding the effect of neutrons generated by fission exerted on the next fission. FIG. 10 is a graph showing a change in incremental ratio of the neutron infinite multiplication factor depending on a change in offset amount Y. In this figure, the ordinate designates a relative value of the neutron infinite multiplication factor, which represents an incremental ratio y% on the basis of the neutron infinite multiplication factor upon the offset amount Y=0; and the abscissa designates the difference (X2−X1) mm between the heights of the spacer tabs $8b1$ and $8b2$.

Referring to FIG. 10, as the value on the ordinate is increased, the neutron infinite multiplication factor is increased. To be more specific, as the value on the ordinate is increased, the neutrons come to be effectively used, so that the fuel is correspondingly saved and the fuel economy is improved. In FIG. 10, as the difference X2−X1 starts to be increased from zero, the incremental ratio y%. is rapidly increased. However, in a region in which the difference X2−X1 is 0.5 mm or more, the increased rate of the incremental ratio y% is reduced. After that, the incremental ratio y% is gradually saturated even if the difference X2−X1 is further increased, and when the difference X2−X1 becomes 4 mm, the incremental ratio Y% becomes 0.2%. The increase in neutron infinite multiplication factor by 0.2% corresponds to the reduction in the enrichment of U-235 by about 0.03%. As a result, to improve the fuel economy, the difference X2−X1 may be preferably set at a value of 0.5 mm or more (X2−X1≧0.5 mm)

In this embodiment, since the difference X2−X1 is set at 1 mm (Y=$2^{-1/2}$ mm) which satisfies the above relationship of X2−X1≧0.5 mm, it is possible to ensure the effect of reducing the local peaking factor and hence to improve the fuel economy.

However, in actual, the value X2−X1 has an upper limit. This will be described below. In the case of the fuel assembly including fuel rods placed in a square lattice array of 9-rows/9-columns, as described in "nuclear engineering INTERNATIONAL", vol. 43, No. 530 (September, 1988; Wilmington Business Publication) p12−31, the diameter of a fuel rod is generally about 11.0 mm. To ensure the thermal margin, it is required to set a gap between the adjacent fuel rods at about 3 mm. In this case, a distance between both ends of the nine pieces of the fuel rods becomes 123 mm (11.0×9+3×(9−1)=123), and the inner width W of a channel box which surrounds the fuel bundle is about 134 mm as described in the above-described "nuclear engineering INTERNATIONAL" and "9×9 Fuel in Boiling Water Type Nuclear Power Station" (February, 1998, Hitachi, Ltd.).

Accordingly, the remaining distance between a fuel rods positioned at the outermost periphery of the square lattice array and the inner peripheral surface of the channel box on both sides is 11 mm at maximum (134−123=11). Meanwhile, a gap of 2 mm or more is generally required between the fuel rod positioned at the outermost periphery of the square lattice array and the inner peripheral surface of the channel box because a band of each fuel spacer must be inserted in the gap. It is generally required to give the same gap from the viewpoint of the thermal margin. As a result, the actually usable remaining distance between the fuel rods positioned at the outermost periphery of the square lattice array and the inner peripheral surface of the channel box for offsetting the fuel bundle becomes 7 mm (11−2×2=7). To be more specific, when the fuel bundle is offset on the channel fastener side, the actually movable maximum distance in the row or column direction of the square lattice array becomes 7 mm. In this embodiment, the difference X2−X1 is set at 1 mm which is less than the maximum value, that is, 7 mm.

(3) Prevention of Reduction in Thermal Margin

In this embodiment, unlike the structure in the above-described U.S. Pat. No. 2,791,132, the fuel bundle 6 is offset, that is, the fuel rod pitch is not changed. Accordingly, the thermal margin is not reduced as compared with the fuel assembly of the prior art D-lattice core. This will be described with reference to FIG. 11.

Figure 11:
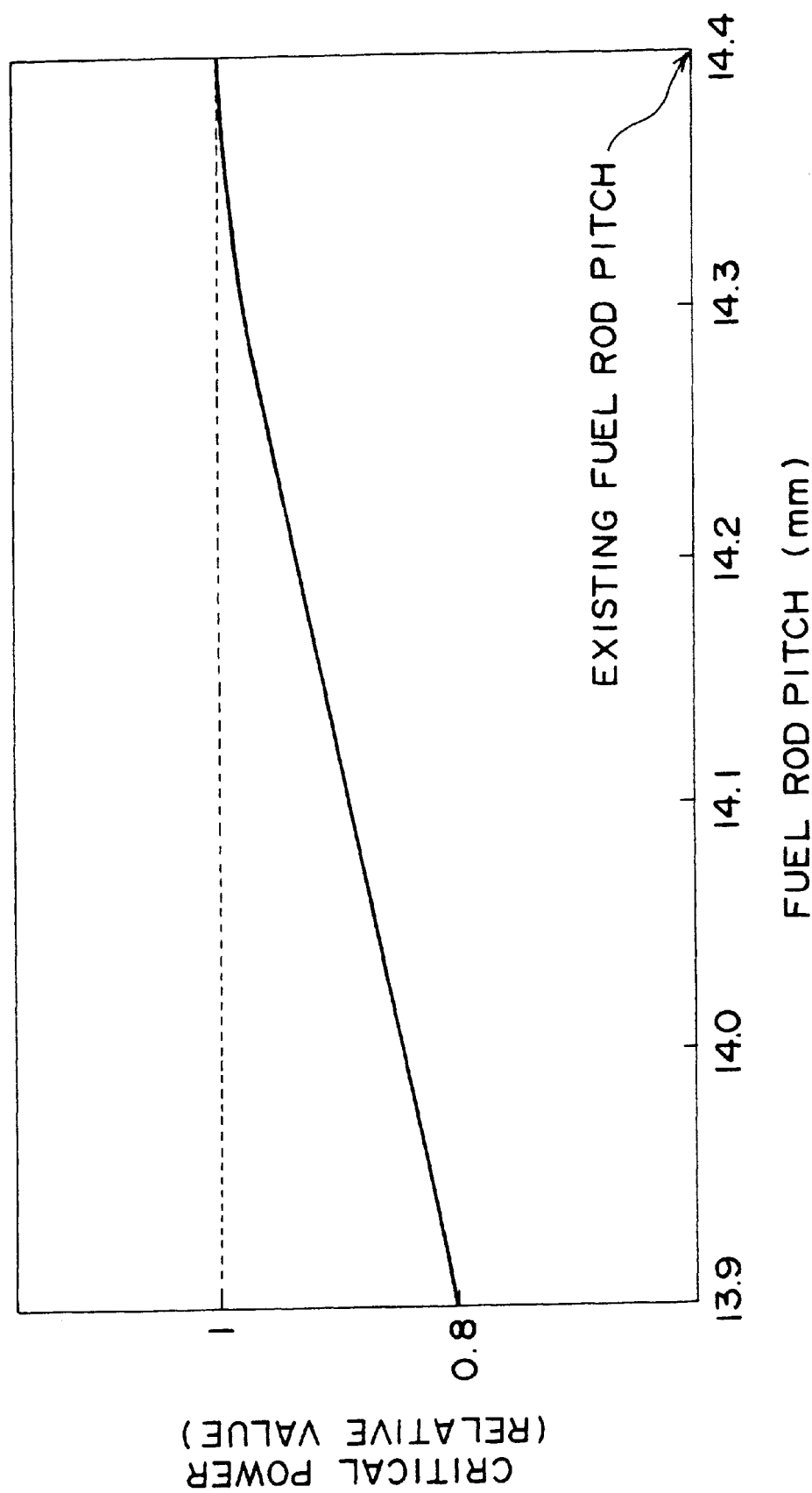
FIG. 11 is a graph showing a result of examining a relationship between the fuel rod pitch and the critical power of a fuel assembly.

The present inventors have examined, by numerical analysis, a relationship between the arrangement pitch of fuel rods and the critical power of a fuel assembly, and obtained a result shown in FIG. 11. FIG. 11 shows a change in critical power depending on a change in arrangement pitch of fuel rods. In this figure, the abscissa designates the fuel rod pitch, and the ordinate designates a relative value of the critical power of the fuel assembly. The fuel rod pitch of 9-rows/9-columns array in the prior art D-lattice fuel assembly is 14.4 mm, as described in the above-described "9×9 Fuel in Boiling Water Type Nuclear Power Station". Such a value (existing pitch) is equivalent to the right end of the abscissa and the critical power corresponding to the existing pitch is expressed by 1.

As shown in FIG. 11, there is a linearly increasing relationship between the fuel rod pitch and the critical power. To be more specific, as the fuel rod pitch is reduced from the existing pitch, the critical power is linearly reduced. As a result, according to the configuration of the prior art fuel assembly, the local peaking factor can be improved; however, the thermal margin is reduced due to lowering of the critical power. To prevent the reduction in thermal margin, the fuel rod pitch must be substantially equal to that of the prior art D-lattice fuel assembly.

As described above, the fuel rod pitch of the prior art D-lattice fuel assembly is 14.4 mm. In consideration of manufacturing errors, the present inventors have considered that it may be desirable to set the fuel rod pitch in a range of 14.15 mm to 14.65 mm. In this embodiment, since the fuel rod pitch is 14.4 mm which is within the above range, it is possible to prevent the reduction in thermal margin, which has appeared in the prior art fuel assembly.

(4) Usability of Existing Fuel Spacer

In general, a fuel spacer includes holding members (for example, cylindrical members) for holding fuel rods and water rods such that they are spaced from each other at specific gaps. If the fuel rod pitch is changed as in the prior art structure, the pitch of the holding members must be correspondingly changed. As a result, in the prior art structure, the existing fuel spacers cannot be used and new fuel spacers must be prepared. On the contrary, in this embodiment, since the fuel rod pitch is not changed, the existing fuel spacers 6 can be used as they are.

(5) Function of Ensuring Reactor Shutdown Margin

In general, for a fuel assembly of a boiling water reactor, as the size of a channel box becomes smaller, the reactor shutdown margin becomes smaller. This is shown, for example, in FIG. 6 of Japanese Patent No. 2791132. In this figure, the channel box is made small to increase the narrow water gap width relative to the wide water gap width, a difference in reactivity between upon power operation and upon cold shutdown becomes small. The reason for this will be described below.

The width of a region in which water is continuously present exerts the largest effect on the reactor shutdown margin. In particular, in the gap between the fuel assemblies, water is continuously present over a wide region. The width of the water region in the gap between the fuel assemblies is specified by the channel box. To be more specific, by increasing the size of the channel box, the amount of water in the gap between the fuel assemblies is correspondingly reduced, so that the reactor shutdown margin is made small.

Accordingly, to ensure the reactor shutdown margin substantially comparable to that of the prior art fuel assembly, the size of the channel box may be equal to that of the channel box of the prior art fuel assembly. As described in the above-documents "9×9 Fuel in Boiling Water Type Nuclear Power Station" and "nuclear engineering INTERNATIONAL", the inner width of the channel box of the prior art D-lattice fuel assembly is about 134 mm. In consideration of manufacturing errors, the present inventors have considered that it may be desirable to set the inner width of the channel box in a range of 133.5 mm to 134.5 mm. In this embodiment, since the inner width of the channel box 11 is 134.1 mm which is within the above range, it is possible to ensure the reactor shutdown margin comparable to that of the prior art D-lattice fuel assembly.

As described above, according to the fuel assembly 1A in this embodiment, it is possible to achieve the fuel economy comparable to that of a C-lattice core without reducing the thermal margin, and to utilize the existing fuel spacers as they are.

It should be noted that many variations of the above-described embodiment may be made without departing from the scope of the present invention. Some of such variations may be described below.

Variation (a)—Structure of Fixing Tabs of Fuel Spacer by Welding

Figure 12:
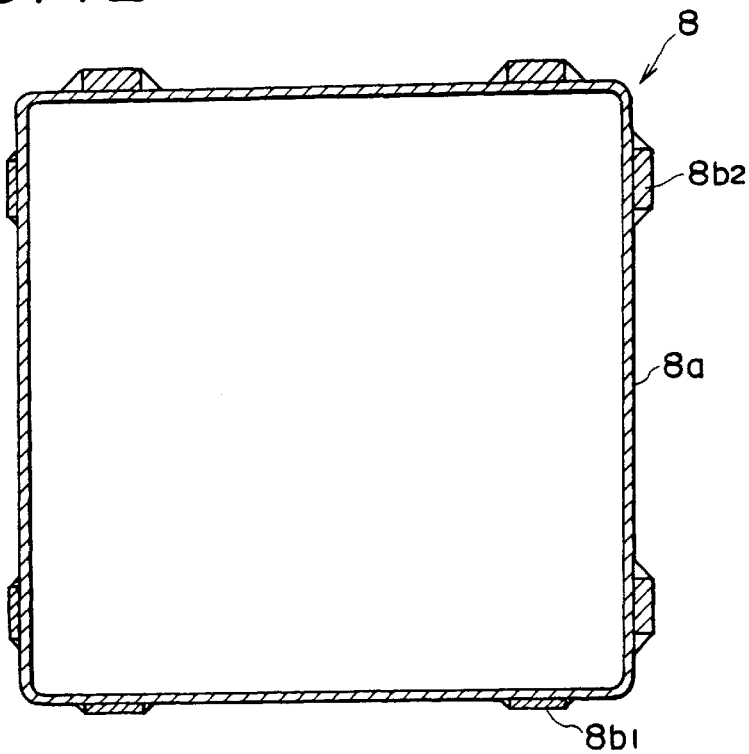
FIG. 12 is a view showing an essential structure of a variation in which tabs of a fuel spacer are fixed by welding.

FIG. 12 is a sectional view showing a detailed structure of a fuel spacer 8 according to this variation, in which cylindrical members and spring members are not shown like FIG. 1. Referring to FIG. 12, tabs 8b2 having a large height and tabs 8b1 having a small height are fixed on a band 8a by welding. In this case, it is possible to eliminate the necessity of forming the tabs 8b1 and 8b2 by extruding associated portions of the band 8a as in the above embodiment, and hence to make the degree of freedom in design larger than that in the above embodiment. Additionally, only the tabs 8b2 may be fixed by welding and the tabs 8b1 may be formed by extrusion like the above embodiment. This leads to an advantage in reducing the working cost.

Variation (b)—Structure of Providing Tabs Even on Channel Box

Figure 13:
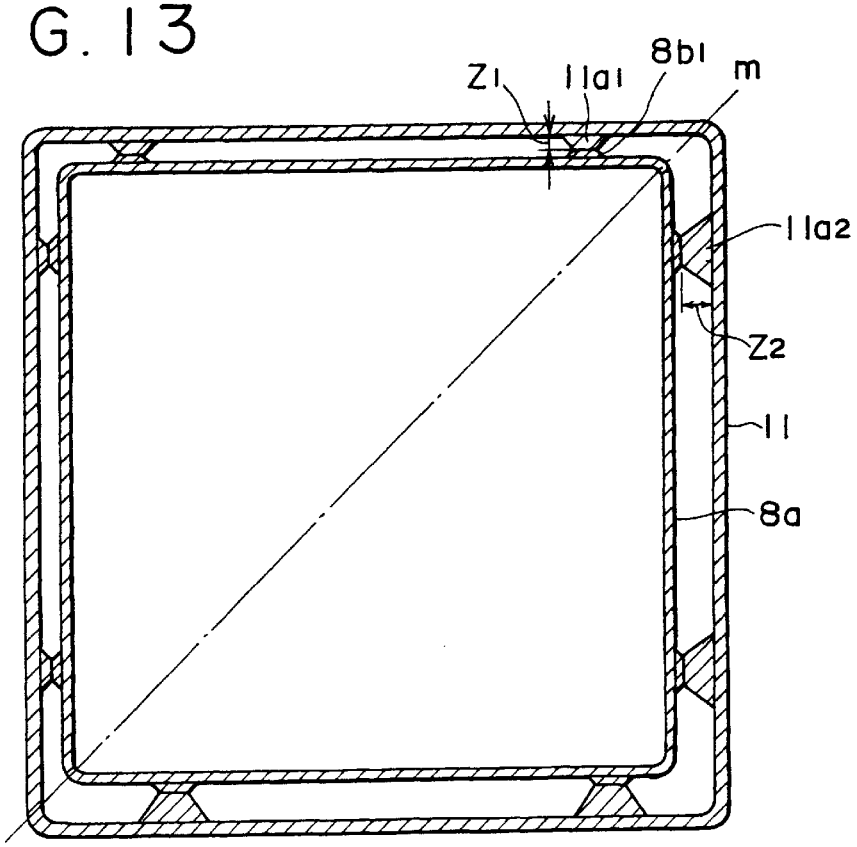
FIG. 13 is a view showing an essential structure of a fuel spacer in a variation in which tabs are provided on a channel box, and also showing a transverse cross-section of the channel box.

FIG. 13 shows a transverse sectional structure of a fuel spacer 8 and a channel box 11 according to this variation, in which cylindrical members and spring members are not shown like FIG. 12. Referring to FIG. 13, the tabs 8b1 having the same relatively small height are provided on the fuel spacer 8, and inwardly projecting tabs 11a1 and 11a2 are provided on the inner peripheral surface of the channel box 11 in such a manner that the tabs 11a1 and 11a2 are in contact with the tabs 8b1. To be more specific, the tabs 11a2 having a large height Z2 are disposed on one side (lower right side, anti-control rod side in FIG. 13) with respect to a diagonal line m of the transverse cross-section, and the tabs 11a1 having a small height Z1 are disposed on the other side (upper left side, control rod side in FIG. 13) with respect to the diagonal line m. These tabs 11a1 and 11a2 also function as the above-described offsetting/holding means.

Figure 14:
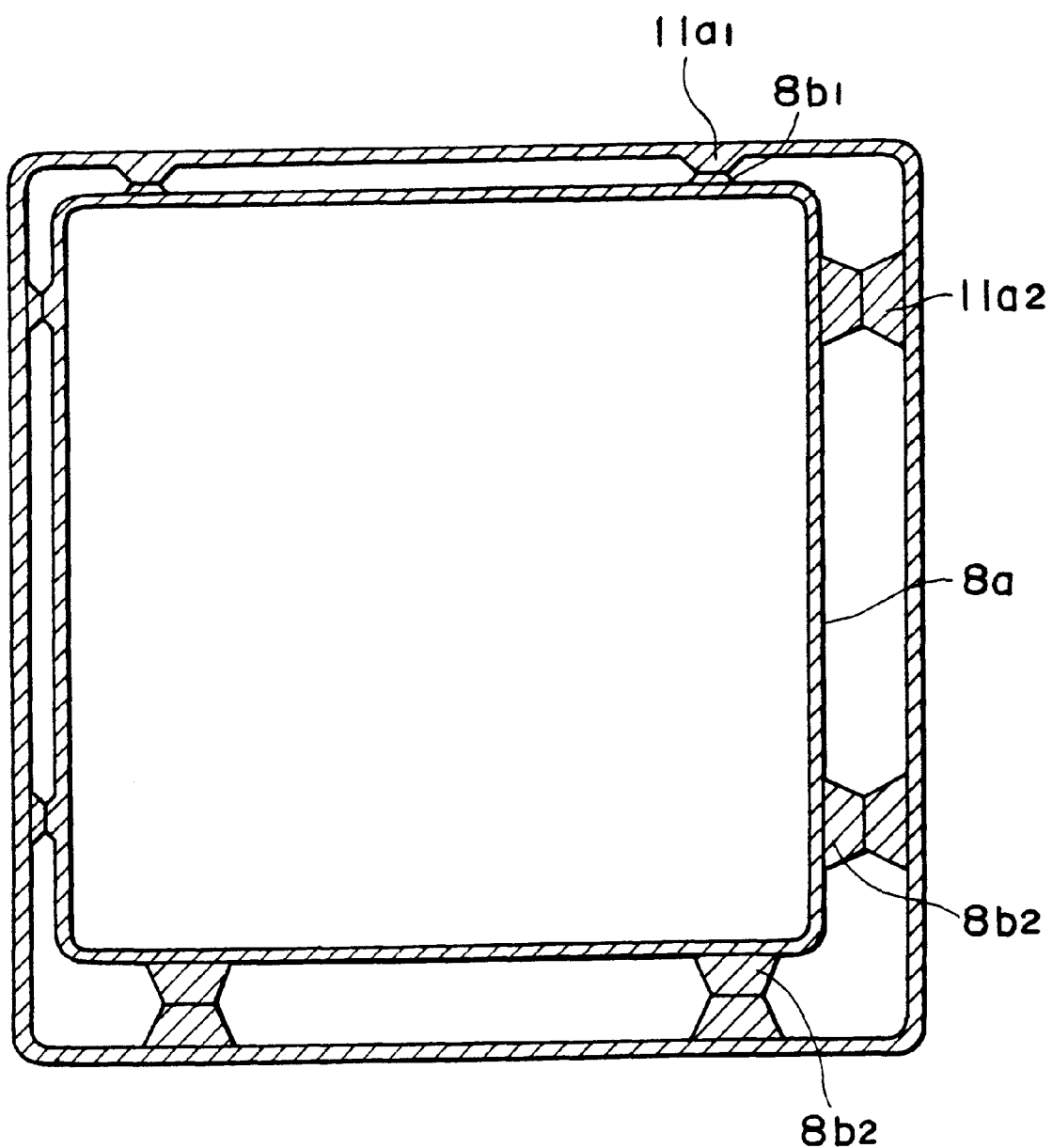
FIG. 14 is a view showing an example in which tabs each having a small height and tabs each having a large height are additionally provided to the structure shown in FIG. 13.

The thickness of the channel box 11 is generally larger than that of the band 8a of the fuel spacer 8, and accordingly, the degree of freedom in design becomes larger than that in the above embodiment. In addition, the tabs than having the small height may be omitted and only the tabs 11a2 may be provided. This is advantageous in reducing the working cost. It may be considered to omit the tab 8b1 on the fuel spacer 8 side and provide only the tabs 11a1 and 11a2 on the channel box 11 side. Further, as shown in FIG. 14, tabs 8b1 having a small height and tabs 8b2 having a large height may be disposed on the fuel spacer 8. This is particularly suitable for a structure in which the offset amount of the fuel bundle is made larger.

Variation (c)—Application to Structure Including Square Type Water Rod

Figure 15:
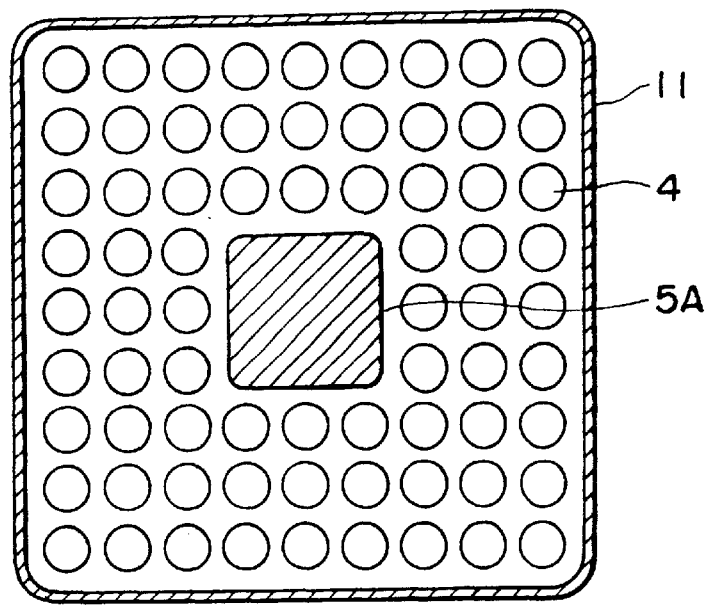
FIG. 15 is a view showing a structure in which one square water rod is disposed at the central portion in a square lattice array of 9-rows/9-columns.
Figure 16:
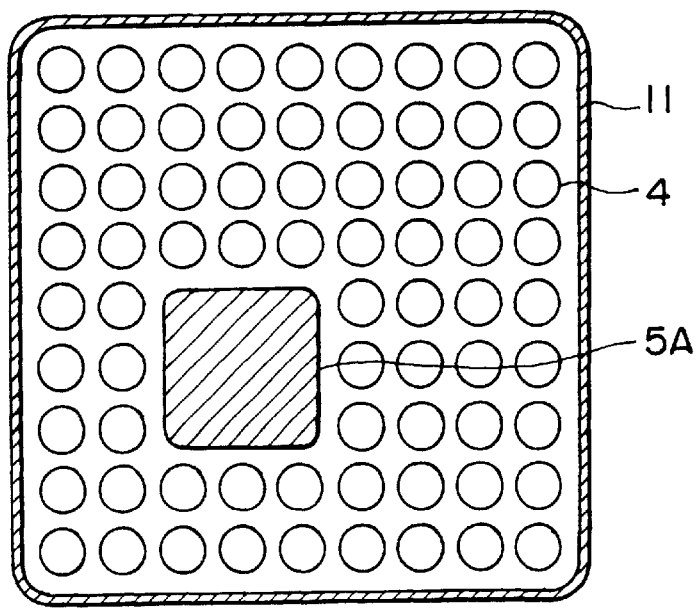
FIG. 16 is a view showing a structure in which one square water rod is disposed in a square lattice array of 9-rows/9-columns at a position offset from the central portion.

In the above embodiment, the present invention is applied to the structure in which the two water rods 5 are disposed in the square lattice array of 9-rows/9-columns; however, the present invention is not limited thereto but may be applied to a structure shown in FIG. 15 in which one square water rod is disposed in a square lattice array of 9-rows/9-columns. In this case, the same effect can be obtained. Further, the present invention can be applied to a structure shown in FIG. 16 in which a square water rod 5A is disposed in such a manner as to be offset from the center in a cross section of the square lattice array.

Variation (d)—Application to Array of 10-rows/10-columns

Figure 17:
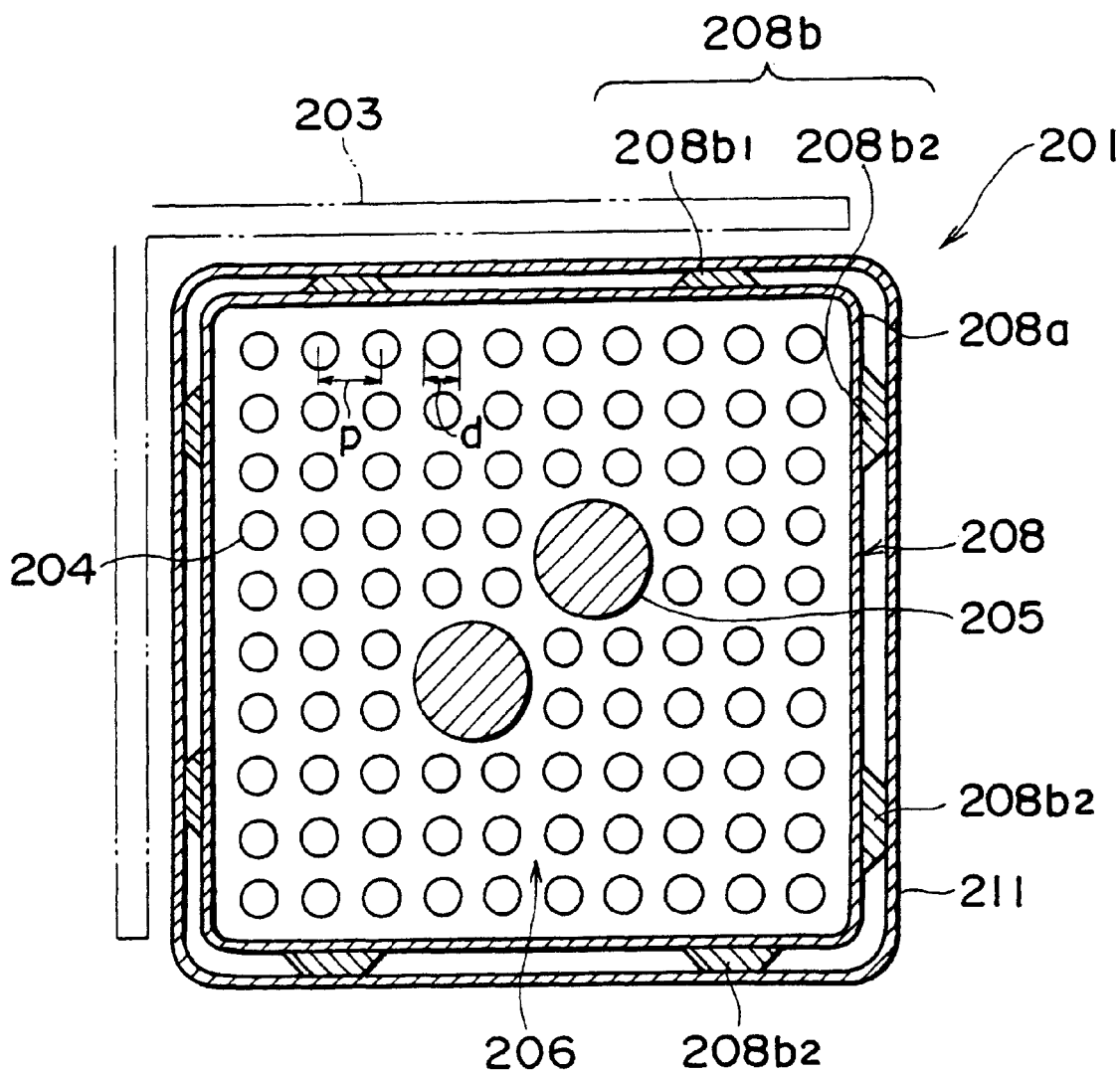
FIG. 17 is a horizontally transverse sectional view of a fuel assembly including fuel rods placed in a square lattice array of 10-rows/10-columns.

In the above embodiment, the present invention is applied to the fuel assembly of the square lattice array of 9-rows/9-columns; however, the present invention is not limited thereto and may be applied to a fuel assembly of a square lattice array of 10-rows/10-columns. FIG. 17 is a horizontally transverse sectional view of a fuel assembly 201 in this variation, which is equivalent to FIG. 1 showing the fuel assembly 1 in the above embodiment. In FIG. 17, parts corresponding to those of the fuel assembly 1 in the above embodiment are designated by reference numerals obtained by adding 200 to the reference numerals of the parts shown in FIG. 1, and the overlapped explanation thereof is omitted.

Referring to FIG. 17, a fuel bundle 206 includes fuel rods 204 placed in a square lattice array of 10-rows/10-columns. Like the structure shown in FIG. 1, the position of the square lattice array is offset as a whole in the upward, leftward direction in FIG. 17. To be more specific, the center in a cross section of the array is offset from the center in a cross section of a channel box 211 toward the control rod side. The offset amount Y is $2^{-1/2}$ mm in the upward, leftward direction in FIG. 17. In other words, the offset amount Y includes an offset component of 0.5 mm in the upward direction and an offset component of 0.5 mm in the leftward direction in FIG. 17.

In this variation, 92 pieces of the fuel rods 204 are disposed; the outside diameter d of each fuel rod 204 is 10.05 mm; and the fuel rod pitch p of the fuel rods 204 is 12.9 mm. These fuel rods 204 may include short-length fuel rods like the fuel rods 4b shown in FIG. 1. Two water rods 205 are disposed at an approximately central portion of the fuel assembly 201. In this case, four pieces of the fuel rods 204 of 2-rows/2-columns are replaced with each water rod 205. Like the structure shown in FIG. 1, the inner width W of the channel box 211 is 134.1 mm.

The center in a cross section of a fuel spacer 208 is equal to the center in a cross section of the fuel bundle 206. Like the fuel spacer 8 shown in FIG. 1, the fuel spacer 208 includes a band 208a and tabs 208b. To be more specific, four pieces of the tabs 208b1 are disposed on the control rod side, and four pieces of the tabs 208b2 are disposed on the anti-control rod side. Like the structure shown in FIG. 1, a difference (X2−X1) between the height X2 of the tab 208b2 and the height X1 of the tab 208b1 is 1 mm. The other configuration in this variation is substantially the same as that of the fuel assembly 1 in the above embodiment.

As is apparent from the above description, even in this variation, there can be obtained the same functions as those of the above embodiment, that is, the functions of (1) reducing the local peaking factor due to the offset structure, (2) ensuring the reduction in the local peaking factor due to setting of the offset amount, (3) preventing lowering of the thermal margin, (4) realizing usability of the existing fuel spacers, and (5) ensuring the reactor shutdown margin. With respect to the function (3), a relationship between the fuel rod pitch placed in the prior art square lattice array of 10-rows/10-columns and the fuel rod pitch in this variation will be described in detail below.

According to the document described in the above embodiment, "9×9 Fuel in Boiling Water Type Nuclear Power Station" (February, 1998, Hitachi, Ltd.", the inner width W of the channel box surrounding the fuel bundle of the square lattice array of 9-rows/9-columns is the same as that in the square lattice array of 8-rows/8-colmns, that is, about 134 mm. Further, even for the square lattice array of 10-rows/10-columns, as described in the above document "nuclear engineering INTERNATIONAL", the inner width W of the channel box is about 134 mm.

As described in the above document "9×9 Fuel in Boiling Water Type Nuclear Power Station", the distance g between the fuel rod positioned at the outer periphery of the square lattice array and the inner peripheral surface of the channel box in the case of the fuel assembly of 8-rows/8-columns is the same as that in the case of the fuel assembly of 9-rows/9-columns. To be more specific, for the fuel assembly of 8-rows/8-columns, since the fuel rod pitch is 16.3 mm and the diameter of the fuel rod is 12.3 mm, the distance g becomes 3.85 mm [(134−16.3×7−12.3)/2=2.85]; and for the fuel assembly of 9-rows/9-columns, since the fuel rod pitch is 14.4 mm and the diameter of the fuel rod is 11.2 mm, the distance g becomes 3.85 mm [(134.1−14.4×8−11.2)/2= 3.85)]. Even for the fuel assembly of 10-rows/10-columns, the distance g similarly becomes 3.85 mm.

On the other hand, for the fuel assembly of 10-rows/10-columns, as described in the above document "nuclear engineering INTERNATIONAL", the diameter d of the fuel rod is generally 10.05 mm. From the above inner width W=134 mm, the distance g=3.85 mm, and the diameter d=10.05 mm, the fuel rod pitch p becomes 12.9 mm [(134− 2×3.85−10.05)/9].

In this way, the arrangement of the fuel rods in the prior art fuel assembly of 10-rows/10-columns becomes 12.9 mm. In consideration of manufacturing errors, the present inventors have considered that it may be desirable to set the fuel rod pitch in a range of 12.65 mm to 13.15 mm. In this variation, since the fuel rod pitch is 12.9 mm which is within the above range, it is possible to prevent the reduction in thermal margin.

With respect to the function (2), even for the fuel assembly of 10-rows/10-columns, like the fuel assembly of 9-rows/9-columns, the difference X2−X1 has an upper limitation. This will be described below. As described, for the fuel assembly of 10-rows/10-columns, the diameter d of the fuel rod is generally 10.05 mm, and to ensure the thermal margin, it is required to set the gap between the adjacent fuel assemblies at about 2.5 mm. In this case, the distance between both ends of 10 pieces of the fuel rods becomes 123.0 mm (10.05×10+2.5×(10−1)=123.0). The inner width W of the channel box which surrounds the fuel bundle is, as described above, 134 mm. Accordingly, the remaining distance between the fuel rods positioned at the outer periphery of the square lattice array and the inner peripheral surface of the channel box on both sides is 11 mm at maximum (134−123=11).

Meanwhile, a gap of 2 mm or more is generally required between the fuel rod positioned at the outermost periphery of the square lattice array and the inner peripheral surface of the channel box. As a result, the actually usable remaining distance between the fuel rods positioned at the outermost periphery of the square lattice array and the inner peripheral surface of the channel box for offsetting the fuel bundle becomes 7 mm (11−2×2=7). In this variation, the difference X2−X1 is set at 1 mm which is less than the maximum value, that is, 7 mm.

Figure 18:
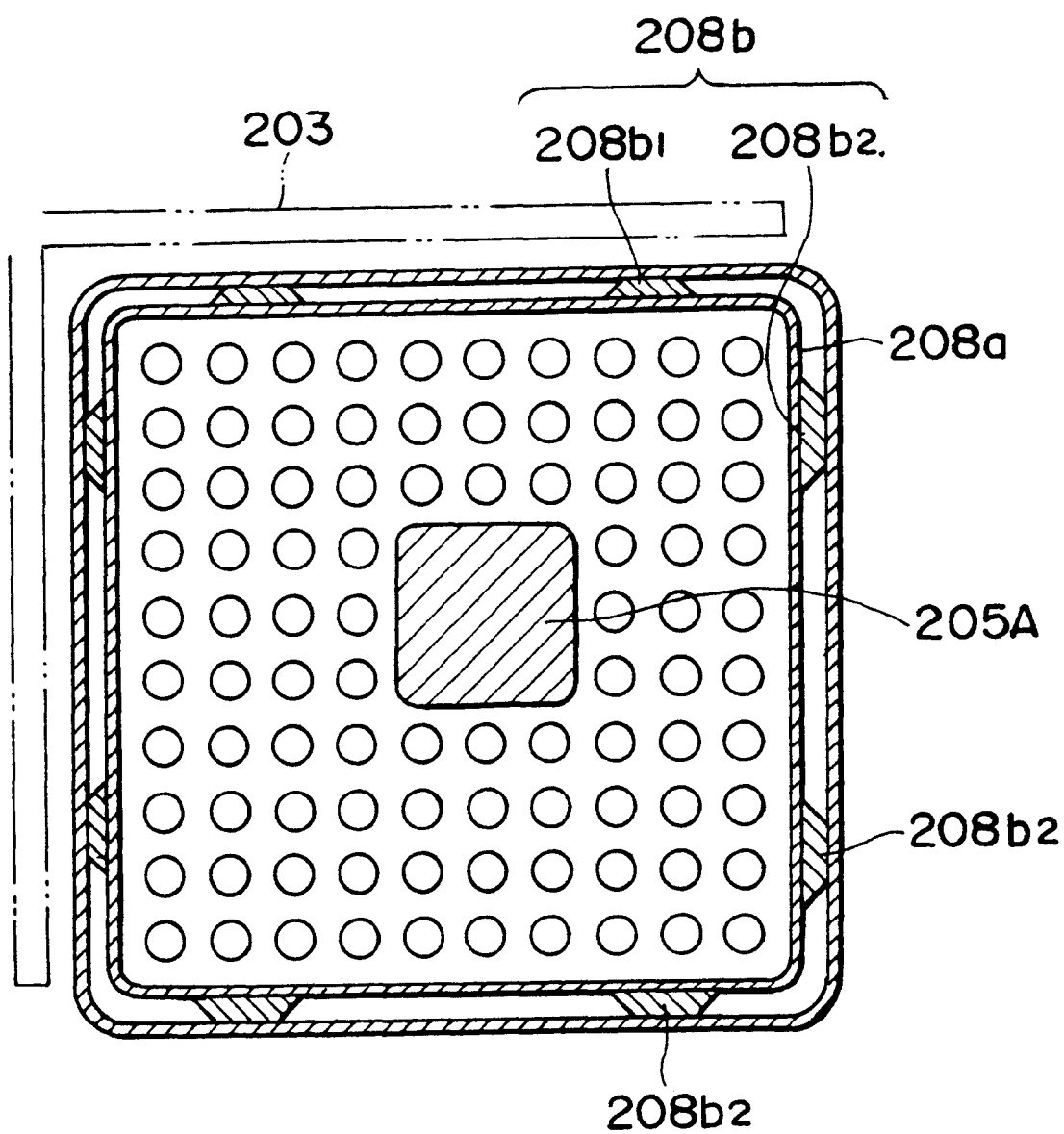
FIG. 18 is a view showing a structure in which one square water rod is disposed in the square lattice array of 10-rows/10-columns at a position offset from the central portion.

As described above, even in this variation, it is possible to achieve the fuel economy comparable to that of a C-lattice core without reducing the thermal margin, and to utilize the existing fuel spacers as they are. In addition, as shown in FIG. 18, the present invention can be applied to a structure in which a square water rod 205A is disposed in such a manner as to be offset from the center in a cross section of the square lattice array.

Variation (e)—Application to Fuel Assembly of 11-rows/11-columns

Figure 19:
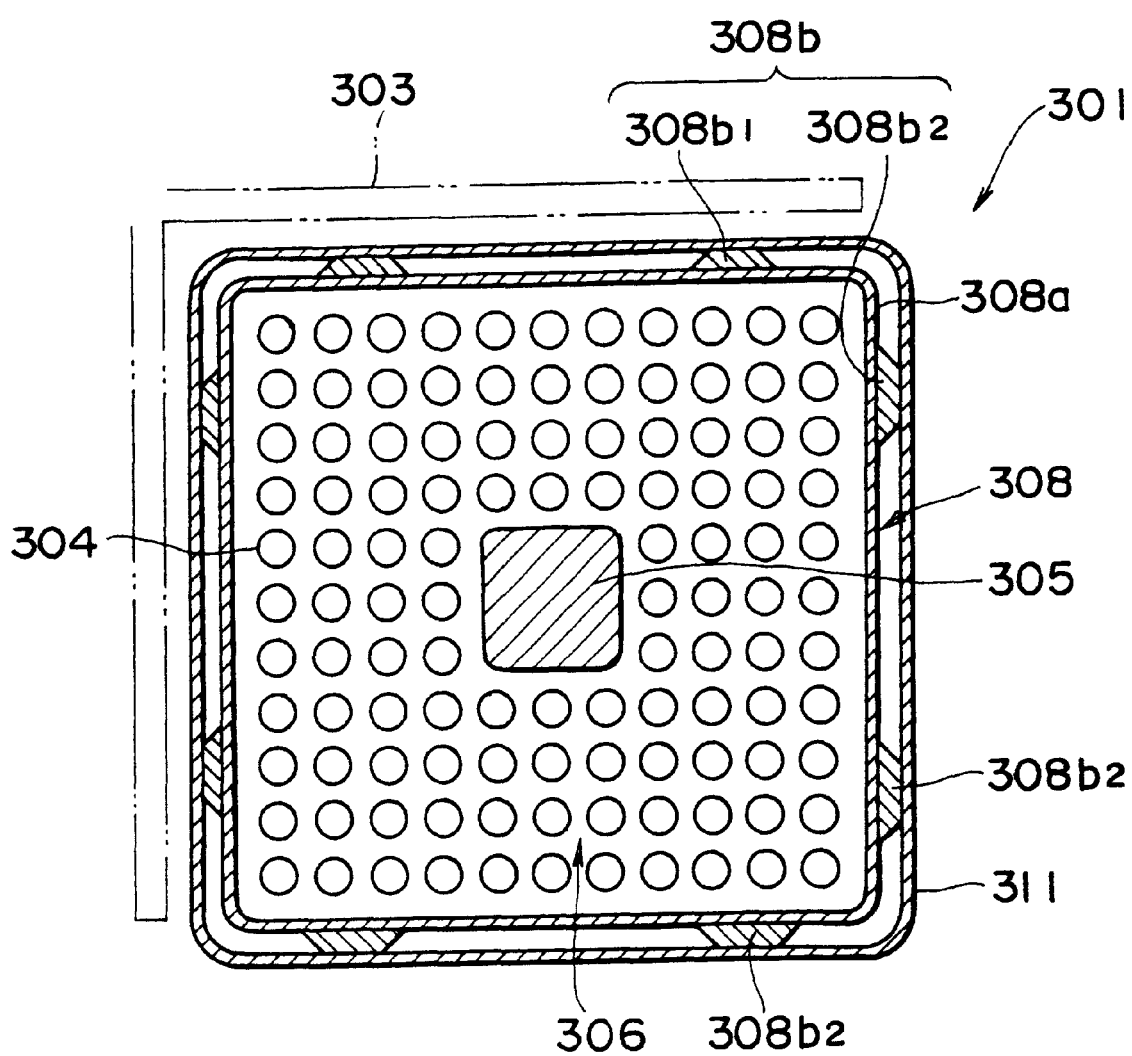
FIG. 19 is a horizontally transverse sectional view of a fuel assembly including fuel rods placed in a square lattice array of 11-rows/11-columns.

The present invention can be also applied to a fuel assembly of a square lattice array of 11-rows/11-columns. FIG. 19 is a horizontally transverse sectional view of a fuel assembly 301 in this variation, which is equivalent to FIG. 1 showing the fuel assembly 1 in the above embodiment. In FIG. 19, parts corresponding to those of the fuel assembly 1 in the above embodiment are designated by reference numerals obtained by adding 300 to the reference numerals of the parts shown in FIG. 1, and the overlapped explanation thereof is omitted.

Referring to FIG. 19, a fuel bundle 306 includes fuel rods 304 placed in a square lattice array of 11-rows/11-columns. Like the structure shown in FIG. 1, the position of the square lattice array is offset as a whole in the upward, leftward direction in FIG. 19. To be more specific, the center in a cross section of the array is offset from the center in a cross section of a channel box 311 toward the control rod side. The offset amount Y is $2^{-1/2}$ mm in the upward, leftward direction in FIG. 19. In other words, the offset amount Y includes an offset component of 0.5 mm in the upward direction and an offset component of 0.5 mm in the leftward direction in FIG. 19.

In this variation, 112 pieces of the fuel rods 304 are disposed, and the outside diameter d of each fuel rod 304 is 9.2 mm. These fuel rods 304 may include short-length fuel rods like the fuel rods 4b shown in FIG. 1. The fuel rod pitch p of the fuel rods 304 is 11.7 mm. One square water rod 305 is disposed at an approximately central portion of the fuel assembly 301. In this case, nine pieces of the fuel rods 304 of 3-rows/3-columns are replaced with the water rod 305. Like the structure shown in FIG. 1, the inner width W of the channel box 311 is 134.1 mm.

The center in a cross section of a fuel spacer 308 is equal to the center in a cross section of the fuel bundle 306. Like the fuel spacer 8 shown in FIG. 1, the fuel spacer 308 includes a band 308a and tabs 308b. A difference (X2−X1) between the height X2 of the tab 308b2 on the control rod side and the height X1 of the tab 308b1 on the anti-control rod side is 1 mm. The other configuration in this variation is substantially the same as that of the fuel assembly 1 in the above embodiment.

Even in this variation, there can be obtained the same functions as those of the above embodiment, that is, the functions of (1) reducing the local peaking factor due to the offset structure, (2) ensuring the reduction in the local peaking factor due to setting of the offset amount, (3) preventing lowering of the thermal margin, (4) realizing usability of the existing fuel spacers, and (5) ensuring the reactor shutdown margin. With respect to the function (3), a relationship between the fuel rod pitch placed in the prior art square lattice array of 11-rows/11-columns and the fuel rod pitch in this variation will be described in detail below.

As described in the above document "nuclear engineering INTERNATIONAL", the number of the fuel rods in the prior art fuel assembly of the square lattice array of 10-rows/10-columns is 91. The number of the long-length fuel rods having a relatively long fuel effective length (usual fuel rods, overall length fuel rods) is 83, and the number of the short-length fuel rods having a relatively short fuel effective length is 8. The fuel effective length of the short-length fuel rod is not particularly described. Here, like the prior art square lattice array of 9-rows/9-columns (for example, described in the above document "9×9 Fuel in Boiling Water Type Nuclear Power Station"), the length of the short-length fuel rod is set at about 15/24 of the length of the long-length fuel rod. In this case, 91 pieces of the fuel rods are equivalent to 88 pieces of the long-length fuel rods (83+8×(15/24)=88)

It is assumed that the number of the prior art fuel assembly of a square lattice array of 11-rows/11-columns is 112 as in this variation. The ratio of the number of the short-length fuel rods to the total number of the fuel rods is assumed to be the same as that in the array of 10-rows/10-columns. In this case, the number of the short-length fuel rods becomes 10 (112×(8/91)=10). That is to say, in the prior art array of 11-rows/11-columns, the number of the long-length fuel rods is 102 and the number of the short-length fuel rods is 10. Assuming that the fuel effective length of the short-length fuel rod is taken as 15/24 of the length of the long-length fuel rod, 112 pieces of the fuel rods are equivalent to 108 pieces of the long-length fuel rods (102+10×(15/24)=108).

In the prior art fuel assembly of the array of 11-rows/11-columns, the value of the fuel effective length is not particularly described. However, since the height of the core of the existing boiling water reactor is generally within a certain range, the fuel effective length of the array of 11-rows/11-columns may be considered to be substantially the same as that of the array of 10-rows/10-columns. The same is substantially true for the fuel inventory. On the assumption of the same fuel effective length, the condition with the same fuel inventory is expressed by (diameter of fuel pellet)×(conversion number of fuel rods based on long-length fuel rod)=(constant)

As described in the above document "nuclear engineering INTERNATIONAL", the diameter of the fuel pellet in the array of 10-rows/10-columns is generally 8.67 mm. The conversion number of the fuel rods based on the long-length fuel rods in the array of 10-rows/10-columns is, as described above, 88. On the other hand, the conversion number of the fuel rods based on the long-length fuel rods in the array of 11-rows/11-columns is, as described above, 108. Letting the diameter of the fuel pellet in the array of 11-rows/11-columns be D, an equation of 8.67×88=D×108 is established. That is to say, the diameter of the fuel pellet D becomes 7.83 mm.

Next, a relationship between the diameter d of the fuel rod and the diameter D of the fuel pellet will be examined. As described in the above document "9×9 Fuel in Boiling Water Type Nuclear Power Station" (February, 1998, Hitachi, Ltd.), in the square lattice array of 9-rows/9-columns, D/d becomes 0.86 (9.6/11.2=0.86). As described in the above document "nuclear engineering INTERNATIONAL", in the square lattice array of 10-rows/10-columns, D/d becomes 0.86 (8.67/10.05=0.86). That is to say, D/d becomes substantially a specific value irrespective of the array of n-rows/n-columns. Accordingly, for the array of 11-rows/11-columns, it can be assumed that D/d is 0.86. As a result, since the diameter D of the fuel pellet is 7.83 mm, the diameter d of the fuel rod becomes 9.2 mm (7.83/0.86=9.2).

As described in the variation (d), the inner width W of the channel box which surrounds the fuel bundle is 134.0 mm irrespective of the array of n-rows/n-columns. The fuel rod pitch p of the square lattice array of 11-rows/11-columns thus becomes 11.7 mm [(134−9.2−3.85×2)/10=11.7].

In this way, the arrangement of the fuel rods in the prior art fuel assembly of 11-rows/11-columns becomes 11.7 mm. In consideration of manufacturing errors, the present inventors have considered that it may be desirable to set the fuel rod pitch in a range of 11.45 mm to 11.95 mm. In this variation, since the fuel rod pitch is 11.7 mm which is within the above range, it is possible to prevent the reduction in thermal margin.

With respect to the function (2), even for the fuel assembly of 11-rows/11-columns, like the fuel assembly of 9-rows/9-columns, the difference X2−X1 has an upper limitation. This will be described below. As described, for the fuel assembly of 11-rows/11-columns, the diameter d of the fuel rod is generally 9.2 mm, and to ensure the thermal margin, it is required to set the gap between the adjacent fuel assemblies at about 2.0 mm. In this case, the distance between both ends of 11 pieces of the fuel rods becomes 121.2 mm (9.2×11+2.0×(11−1)=121.2). The inner width W of the channel box which surrounds the fuel bundle is, as described above, 134 mm. Accordingly, the remaining distance between the fuel rods positioned at the outer periphery of the square lattice array and the inner peripheral surface of the channel box on both sides is 12.8 mm at maximum (134−121.2=12.8).

Meanwhile, a gap of 2 mm or more is generally required between the fuel rod positioned at the outermost periphery of the square lattice array and the inner peripheral surface of the channel box. As a result, the actually usable remaining distance between the fuel rods positioned at the outermost periphery of the square lattice array and the inner peripheral surface of the channel box for offsetting the fuel bundle becomes 8.8 mm (12.8−2×2=8.8). In this variation, the difference X2−X1 is set at 1 mm which is less than the maximum value, that is, 8.8 mm.

As described above, even in this variation, it is possible to achieve the fuel economy comparable to that of a C-lattice core without reducing the thermal margin, and to utilize the existing fuel spacers as they are.

Figure 20:
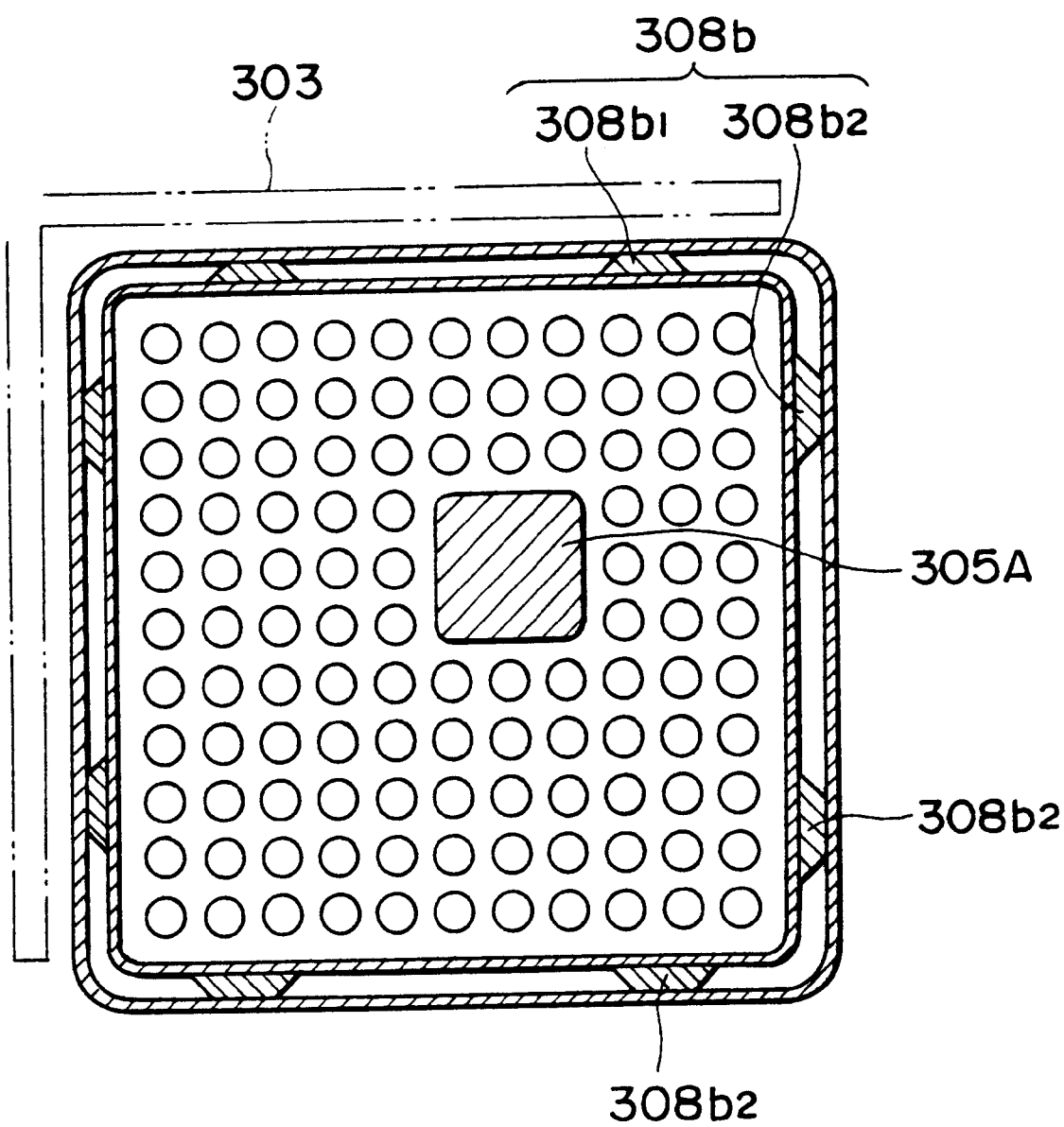
FIG. 20 is a view showing a structure in which one square water rod is disposed in the square lattice array of 11-rows/11-columns at a position offset from the central portion.

In addition, as shown in FIG. 20, the present invention can be applied to a structure in which a square water rod 305A is disposed in such a manner as to be offset from the center in a cross section of the square lattice array.

What is claimed is:

1. A fuel assembly comprising:

a plurality of fuel rods placed in a square lattice array of n-rows/n-columns (n: integer);

at least one water rod placed in a region in which one or more of said fuel rods can be placed;

a lower tie plate for supporting the lower end of a fuel bundle composed of said plurality of fuel rods and said at least one water rod; and a guide post provided for fixing a channel fastener;

wherein said integer n is set at n=10;

the fuel rod pitch of said plurality of fuel rods is in a range of 12.65 mm to 13.15 mm; and means for offsetting and holding said fuel bundle is provided in such a manner that the center in a cross section of said fuel bundle is offset from the center in a cross section of said lower tie plate toward said channel fastener side, the center in a cross section of said lower tie plate being equal to the center in a cross section of a channel box for covering said fuel bundle.

2. A fuel assembly comprising:

a plurality of fuel rods placed in a square lattice array of n-rows/n-columns (n: integer);

at least one water rod placed in a region in which one or more of said fuel rods can be placed;

a lower tie plate for supporting the lower ends of a fuel bundle composed of said plurality of fuel rods and said at least one water rod; and a guide post provided for fixing a channel fastener;

wherein said integer n is set at n=10;

the fuel rod pitch of said plurality of fuel rods is in a range of 12.65 mm to 13.15 mm; and means for offsetting and holding said fuel bundle is provided in such a manner that the center in a cross section of said fuel bundle is offset a value $Y > 2-3/2$ mm from the center in a cross section of said lower tie plate toward said channel fastener side, the center in a cross section of said lower tie plate being equal to the center in a cross section of a channel box for covering said fuel bundle.

3. A fuel assembly according to claim 2, wherein said value Y is in a range of $7 \times 2^{-1/2}$ mm $\geq Y \geq 2^{-3/2}$ mm.

4. A fuel assembly comprising:

a plurality of fuel rods placed in a square lattice array of n-rows/n-columns (n: integer);

at least one water rod placed in a region in which one or more of said fuel rods can be placed;

a lower tie plate for supporting the lower end of a fuel bundle composed of said plurality of fuel rods and said at least one water rod;

fuel spacers for holding a plurality of axial positions of said fuel bundle; and a guide post provided for fixing a channel fastener;

wherein said integer n is set at n=10;

the fuel rod pitch of said plurality of fuel rods is in a range of 12.65 mm to 13.15 mm;

each of said fuel spacers includes a plurality of tabs for offsetting and holding said fuel bundle in such a manner that the center in a cross section of said fuel bundle is offset from the center in a cross section of said lower tie plate toward said channel fastener side, the center in a cross section of said lower tie plate being equal to the center in a cross section of a channel box for covering said fuel bundle, said tabs being provided in such a manner as to project outwardly from the outer periphery of said fuel spacer; and a distance L1 between the leading end of one of said plurality of tabs positioned on the channel fastener side and one of said fuel rods positioned at the outermost periphery of said square lattice array and a distance L2 between the leading end of one of said plurality of tabs positioned on the anti-channel fastener side and one of said fuel rods positioned at the outer most periphery of said square lattice array are determined in such a manner as to satisfy a relationship of L2−L1>0.5 mm.

5. A fuel assembly according to claim 4, wherein said distances L1 and L2 are determined in such a manner as to satisfy a relationship of 7.0 mm $\geq$ L2−L1 $\geq$ 0.5 mm.

6. A fuel assembly comprising:

a plurality of fuel rods placed in a square lattice array if n-rows/n-columns (n: integer);

at least one water rod placed in a region in which one or more of said fuel rods can be placed;

a channel box provided in such a manner as to surround a fuel bundle composed of said plurality of fuel rods and said at least one water rod; and a guide post provided for fixing a channel fastener;

wherein said integer n is set at n=10;

the fuel rod pitch of said plurality of fuel rods is in a range of 12.65 mm to 13.15 mm;

the inner width of said channel box is in a range of 133.5 mm to 134.5 mm; and means for offsetting and holding said fuel bundle is provided in such a manner that the center in a cross section of said fuel bundle is offset from the center in a cross section of said channel box toward said channel fastener side, the center in a cross section of said channel box being equal to the center in a cross section of a lower tie plate for supporting the lower end of said fuel bundle.

* * * * *